United States Patent
Kang et al.

(10) Patent No.: US 9,765,466 B2
(45) Date of Patent: Sep. 19, 2017

(54) BALANCER AND WASHING MACHINE HAVING THE SAME

(71) Applicant: SAMSUNG ELECTRONICS CO., LTD., Suwon-si, Gyeonggi-do (KR)

(72) Inventors: Jeong Hoon Kang, Seoul (KR); Dong Ha Jung, Yongin-si (KR); Min Sung Kim, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 374 days.

(21) Appl. No.: 14/308,940

(22) Filed: Jun. 19, 2014

(65) Prior Publication Data

US 2014/0373672 A1 Dec. 25, 2014

(30) Foreign Application Priority Data

Jun. 19, 2013 (KR) .................. 10-2013-0070592
May 28, 2014 (KR) .................. 10-2014-0064206

(51) Int. Cl.
*D06F 37/22* (2006.01)
*D06F 37/24* (2006.01)
(Continued)

(52) U.S. Cl.
CPC ............ *D06F 37/225* (2013.01); *D06F 37/22* (2013.01); *D06F 37/245* (2013.01);
(Continued)

(58) Field of Classification Search
CPC ........ D06F 37/20; D06F 37/203; D06F 37/22; D06F 37/225; D06F 37/24; D06F 37/245
See application file for complete search history.

(56) References Cited

U.S. PATENT DOCUMENTS 5,806,349 A * 9/1998 Kim ................ D06F 37/245
68/23.2
6,005,749 A * 12/1999 Ikuta .................. F16F 15/363
310/51

(Continued)

FOREIGN PATENT DOCUMENTS

CN  1172873 A  2/1998
CN  2750821 Y  1/2006
(Continued)

OTHER PUBLICATIONS

Machine translation of KR 10-2008-0037428, no date.*
(Continued)

*Primary Examiner* — Joseph L Perrin
(74) *Attorney, Agent, or Firm* — Staas & Halsey LLP

(57) ABSTRACT

A balancer of a washing machine having improved balancing performance. The balancer includes a balancer housing having an annular channel therein, at least one mass movably disposed in the channel at least one groove recessed in an inner surface of the balancer housing so as to accommodate the mass, and at least one magnet coupled to an outer surface of the balancer housing to restrict the mass accommodated in the groove when an RPM of the drum is within a specific RPM range. The magnet is configured as a plurality of N poles and S poles which are arranged alternately, and the outermost pole of the magnet among the plural N poles and S poles has a relatively shorter length than another adjacent pole.

18 Claims, 35 Drawing Sheets

(51) Int. Cl.
*F16F 15/14* (2006.01)
*F16F 15/36* (2006.01)

(52) U.S. Cl.
CPC ........ *F16F 15/363* (2013.01); *D06F 2222/00* (2013.01); *Y10T 74/2127* (2015.01)

(56) References Cited

U.S. PATENT DOCUMENTS

| | | | | |
|---|---|---|---|---|
| 6,304,162 | B1* | 10/2001 | Nakatsuka | H01F 7/02 335/302 |
| 6,510,122 | B1* | 1/2003 | Yamauchi | G11B 17/028 369/266 |
| 2001/0038601 | A1 | 11/2001 | Kikuchi et al. | |
| 2012/0084926 | A1* | 4/2012 | Lee | D06F 37/225 8/137 |
| 2013/0111710 | A1* | 5/2013 | Hunts | H01F 7/0242 24/303 |
| 2013/0174690 | A1* | 7/2013 | Yoshinari | D06F 37/245 74/572.4 |

FOREIGN PATENT DOCUMENTS

| | | | |
|---|---|---|---|
| CN | 101169952 A | 4/2008 | |
| CN | 102163881 A | 8/2011 | |
| CN | 102443999 A | 5/2012 | |
| EP | 2 441 872 A2 | 4/2012 | |
| EP | 2 441 872 A3 | 10/2014 | |
| GB | 2410750 A * | 8/2005 | ........... D06F 37/225 |
| KR | 10-2008-0037428 | 4/2008 | |

OTHER PUBLICATIONS

European Search Report issued Dec. 22, 2014 in corresponding European Patent Application No. 14172830.3.
European Office Action dated Aug. 25, 2016 from European Patent Application No. 14172830.3.
Chinese Office Action dated Jun. 16, 2017 in related Chinese Application 201410275844.7.

* cited by examiner

160

260

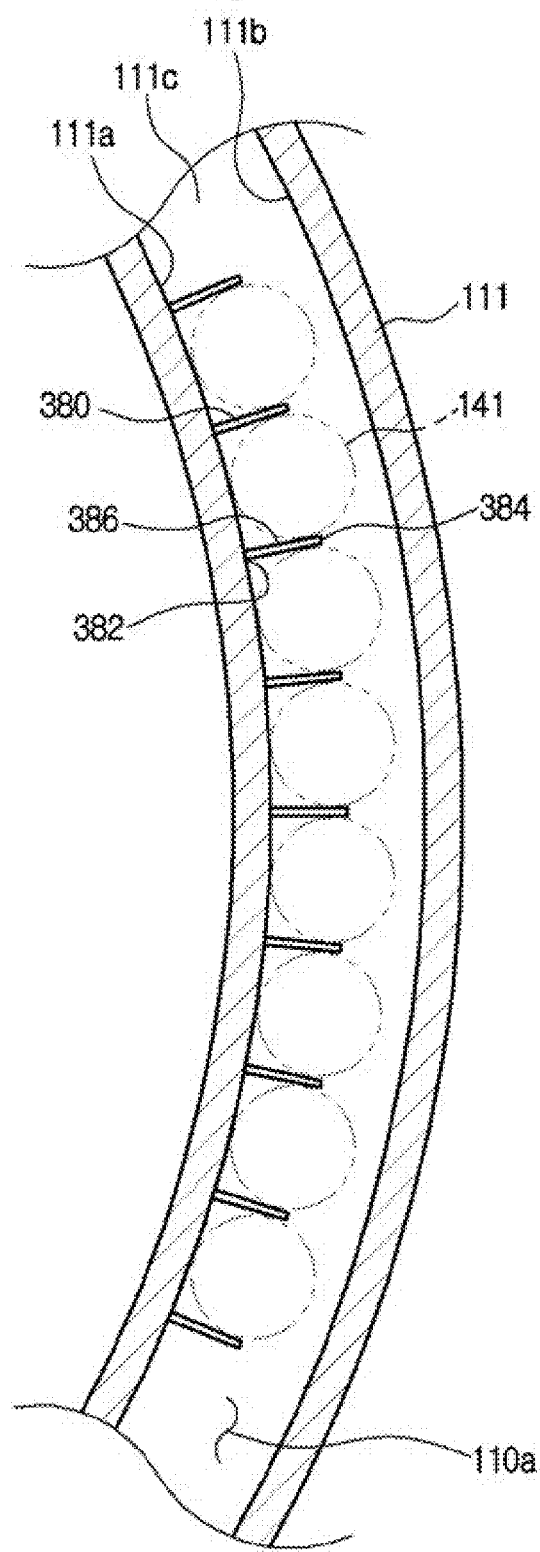

BALANCER AND WASHING MACHINE HAVING THE SAME

CROSS-REFERENCE TO RELATED APPLICATIONS

This application claims the benefit of Korean Patent Application No. 10-2013-0070592, filed on Jun. 19, 2013 and Korean Patent Application No. 10-2014-0064206, filed on May 28, 2014 in the Korean Intellectual Property Office, the disclosures of which are incorporated herein by reference.

BACKGROUND

1. Field

Embodiments of the present disclosure relate to a washing machine including a balancer to offset an unbalanced load caused during rotation of a drum.

2. Description of the Related Art

A washing machine is an apparatus configured to wash clothes using electricity, and generally includes a cabinet defining an external appearance of the washing machine, a tub to store wash water inside the cabinet, a drum rotatably installed inside the tub, and a motor to rotatably drive the drum.

When the drum is rotated by the motor in a state in which laundry and wash water are put into the drum, the laundry rubs against the drum and the wash water so as to allow stains on the laundry to be eliminated.

If the laundry is concentrated at a particular section in the drum without being evenly distributed therein during rotation of the drum, vibration and noise are generated due to the eccentric rotation of the drum, and parts such as the drum and the motor may even be damaged.

Accordingly, the washing machine includes a balancer to stabilize rotation of the drum by offsetting an unbalanced load caused inside the drum.

SUMMARY

Therefore, it is an aspect of the present disclosure to provide a balancer having improved balancing performance and a washing machine having the same.

Additional aspects of the disclosure will be set forth in part in the description which follows and, in part, will be apparent from the description, or may be learned by practice of the disclosure.

In accordance with one aspect of the present disclosure, a balancer mounted to a drum of a washing machine to offset an unbalanced load caused within the drum during rotation of the drum includes a balancer housing having an annular channel therein, at least one mass movably disposed in the channel at least one groove recessed in an inner surface of the balancer housing so as to accommodate the mass, and at least one magnet coupled to an outer surface of the balancer housing to restrict the mass accommodated in the groove when an RPM of the drum is within a specific RPM range, wherein the magnet is configured as a plurality of N poles and S poles which are arranged alternately, and the outermost pole of the magnet among the plural N poles and S poles has a relatively shorter length than another adjacent pole.

A ratio between the length of the outermost pole of the magnet and the length of another pole adjacent to the outermost pole of the magnet may be between 1:3 to 2:3.

A ratio between the length of the outermost pole of the magnet and a diameter of the mass may be between 1:0.6 to 1:1.4.

When the drum is rotated, a direction of centrifugal force acting on the mass may be perpendicular to a direction of magnetic force of the magnet acting on the mass.

The magnet may be coupled to a rear surface of the balancer housing.

The balancer housing may include a first housing opened at one side thereof and a second housing covering the first housing to form the annular channel, and the magnet may be coupled to a rear surface of the first housing.

The magnet may have a relatively longer length than the groove.

The magnet may be disposed at a position corresponding to the groove, and the magnet may be coupled to the balancer housing such that both ends of the magnet protrude farther than both ends of the groove.

A length by which one end of the magnet protrudes farther than one end of the groove may be from 3 mm to 9 mm.

The magnet may be disposed at a position corresponding to the groove, and a gap between the magnet and the groove may be from 1 mm to 3 mm.

The groove may include a flat surface protruding inward of at least the channel, and a gap between the magnet and the flat surface may be from 2 mm to 6 mm.

In accordance with another aspect of the present disclosure, a balancer mounted to a drum of a washing machine to offset an unbalanced load caused within the drum during rotation of the drum includes a balancer housing, at least one mass movably disposed inside the balancer housing, at least one groove recessed in an inner surface of the balancer housing so as to accommodate the mass, and at least one magnet coupled to an outer surface of the balancer housing to restrict the mass accommodated in the groove when an RPM of the drum is within a specific RPM range, wherein the magnet is disposed at a position corresponding to the groove, and a gap between the magnet and the groove is from 1 mm to 3 mm.

Both ends of the magnet may protrude farther than both ends of the groove in a circumferential direction of the balancer housing.

A length in which one end of the magnet protrudes farther than one end of the groove may be from 3 mm to 9 mm.

The magnet may include a first magnet and a second magnet which are disposed at positions symmetrical to each other in the balancer housing.

In accordance with another aspect of the present disclosure, a washing machine includes a cabinet, a drum rotatably arranged within the cabinet, an annular recess provided in the drum, and a balancer to offset an unbalanced load caused within the drum during rotation of the drum, wherein the balancer includes a balancer housing mounted to the recess and having an annular channel therein, at least one mass movably disposed in the channel, at least one groove recessed in an inner surface of the balancer housing so as to accommodate the mass, and at least one magnet coupled to an outer surface of the balancer housing to restrict the mass accommodated in the groove when an RPM of the drum is within a specific RPM range, and wherein the magnet is configured as a plurality of divided magnets arranged in a circumferential direction of the balancer housing, at least one of the plural divided magnets includes at least one N pole and one S pole having different lengths, and any one of the N pole and S pole has a relatively shorter length than the other pole.

A ratio between the length of a relatively longer pole and the length of a relatively shorter pole among the N pole and S pole may be from 1.5:1 to 3:1.

The plural divided magnets may include a first divided magnet, a second divided magnet, and a third divided magnet which are disposed at both sides of the first divided magnet.

The first divided magnet may include at least one N pole and one S pole having the same length as each other.

The second divided magnet may include at least one N pole and one S pole having different lengths, and the outermost pole of the second divided magnet among the N pole and S pole may have a relatively shorter length than another adjacent pole.

In accordance with another aspect of the present disclosure, a balancer mounted to a drum of a washing machine to offset an unbalanced load caused within the drum during rotation of the drum includes a balancer housing having an annular channel therein, at least one mass movably disposed in the channel, and at least one magnet coupled to one side of the balancer housing to restrict the mass from moving along the channel when an RPM of the drum is within a specific RPM range, wherein the magnet includes a plurality of unit magnets spaced apart from each other in a circumferential direction of the balancer housing.

Each of the unit magnets may have a pair of N and S poles.

The N pole and S pole may be arranged in a direction parallel with a rotation axis of the drum.

The N pole and S pole may be arranged in the circumferential direction of the balancer housing.

Each of the unit magnets may have at least two pairs of N and S poles.

In accordance with another aspect of the present disclosure, a balancer mounted to a drum of a washing machine to offset an unbalanced load caused within the drum during rotation of the drum includes a first housing opened at one side thereof, a second housing covering the first housing to form an annular channel, at least one mass movably disposed in the channel, at least one magnet coupled to one side of the first housing, and at least one groove which is formed on an inner surface of the second housing and accommodates the mass so as to restrict the mass from moving along the channel when an RPM of the drum is within a specific RPM range.

In accordance with a further aspect of the present disclosure, a balancer mounted to a drum of a washing machine to offset an unbalanced load caused within the drum during rotation of the drum includes a balancer housing having an annular channel therein, at least one mass movably disposed in the channel, at least one magnet coupled to an outer surface of the balancer housing, and a plurality of protrusions protruding from an inner surface of the balancer housing to restrict movement of the mass when an RPM of the drum is within a specific RPM range.

The plural protrusions may be spaced apart from each other in a circumferential direction of the balancer housing.

Receiving grooves to receive the mass may be provided between the plural protrusions.

The plural protrusions and the receiving grooves mat be alternately arranged.

The balancer housing may include a first housing opened at one side thereof and a second housing covering the first housing to form the annular channel, and the plural protrusions may protrude from any one of inner surfaces of the first and second housings.

The first housing may include first and second inner surfaces facing each other, and a third inner surface connecting the first and second inner surfaces, and the plural protrusions may protrude from any one of the first and third inner surfaces.

Each of the protrusions may be formed in a cantilever shape.

Each of the plural protrusions may include a fixed end fixed to the inner surface of the balancer housing, a free end configured to be freely bent at the inside of the balancer housing, and an extension portion extending from the fixed end to the free end.

The extension portion may extend in a radial direction of the balancer housing.

The extension portion may extend in a direction of a rotation axis of the drum.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 27A and 27B are views for explanation of a process in which masses are restricted by and decoupled between a plurality of protrusions.

DETAILED DESCRIPTION

Figure 1:
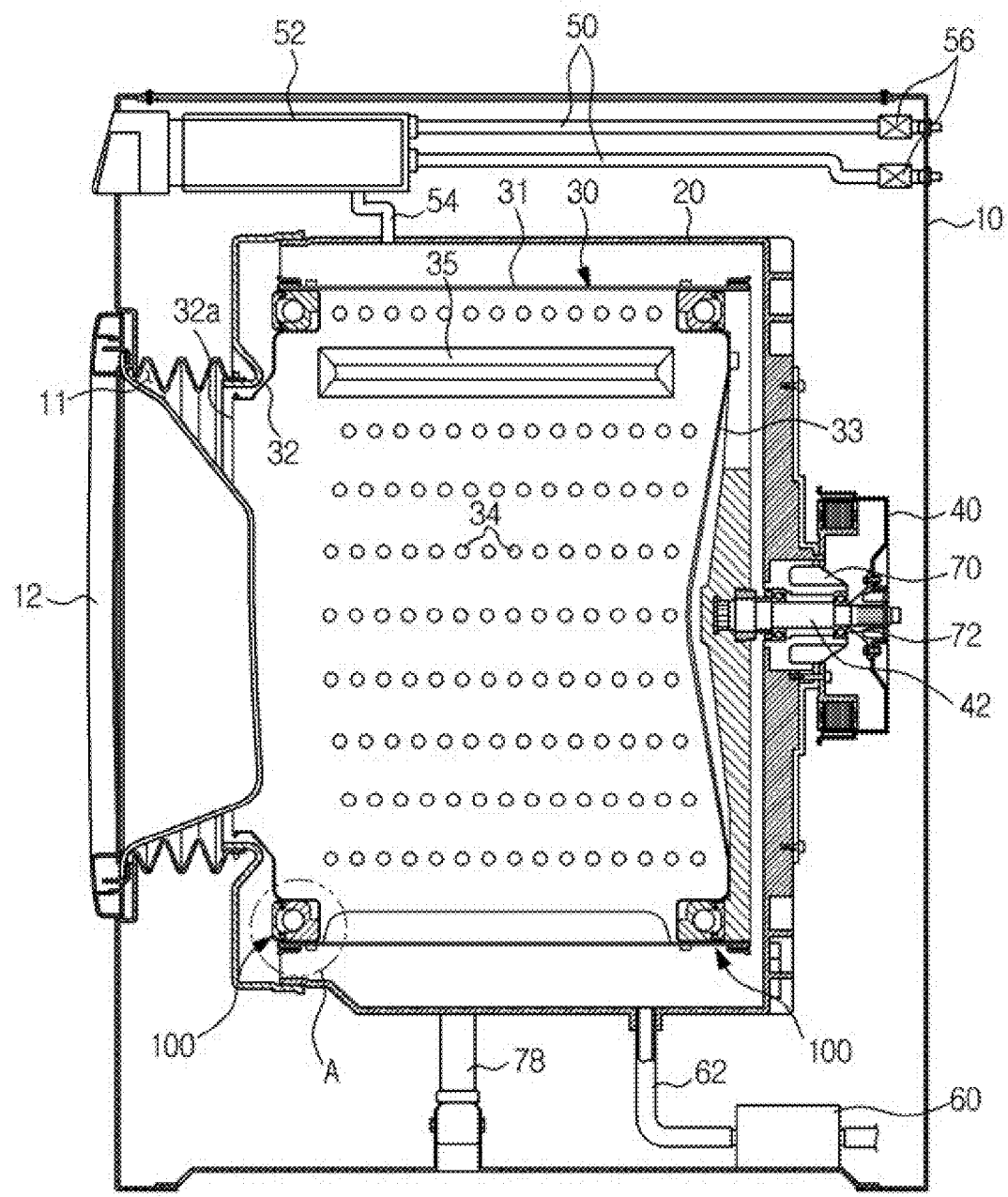
FIG. 1 is a view illustrating a configuration of a washing machine according to an embodiment of the present disclosure.

Reference will now be made in detail to the embodiments of the present disclosure, examples of which are illustrated in the accompanying drawings, wherein like reference numerals refer to like elements throughout.

FIG. 1 is a view illustrating a configuration of a washing machine according to an embodiment of the present disclosure.

As shown in FIG. 1, a washing machine 1 includes a cabinet 10 defining an external appearance thereof, a tub 20 arranged within the cabinet 10, a drum 30 rotatably arranged within the tub 20, and a motor 40 to drive the drum 30.

The cabinet 10 is formed, at a front surface portion thereof, with an insertion port 11 through which laundry may be put into the drum 30. The insertion port 11 is opened and closed by a door 12 mounted to the front surface portion of the cabinet 10.

The tub 20 is installed, at an upper portion thereof, with water supply tubes 50 to supply wash water to the tub 20. Each of the water supply tubes 50 is connected, at one side thereof, with a water supply valve 56 while being connected, at the other side thereof, with a washing agent supply unit 52.

The washing agent supply unit 52 is connected to the tub 20 through a connection tube 54. Water supplied through the water supply tube 50 is supplied into the tub 20 together with washing agents via the washing agent supply unit 52.

The tub 20 is installed, at a lower portion thereof, with a drainage pump 60 and a drainage tube 62 to discharge water within the tub 20 to the outside of the cabinet 10.

The drum 30 includes a cylindrical portion 31, a front surface plate 32 disposed in the front of the cylindrical portion 31, and a rear surface plate 33 disposed in the rear of the cylindrical portion 31. The front surface plate 32 is formed with an opening 32a for insertion of laundry, and the rear surface plate 33 is connected with a drive shaft 42 to which the motor 40 transmits power.

A plurality of through holes 34, through which wash water passes, is formed around the drum 30, and a plurality of lifters 35 is installed on an inner peripheral surface of the drum 30 so that laundry is tumbled during rotation of the drum 30.

The drive shaft 42 is disposed between the drum 30 and the motor 40. One end of the drive shaft 42 is connected to the rear surface plate 33 of the drum 30, and the other end of the drive shaft 42 extends outside a rear wall of the tub 20. When the motor 40 drives the drive shaft 42, the drum 30 connected to the drive shaft 42 rotates about the drive shaft 42.

The rear wall of the tub 20 is provided with a bearing housing 70 so as to rotatably support the drive shaft 42. The bearing housing 70 may be made of an aluminum alloy, and be inserted into the rear wall of the tub 20 during injection molding of the tub 20. Bearings 72 are installed between the bearing housing 70 and the drive shaft 42 so that the drive shaft 42 may be smoothly rotated.

The tub 20 is supported by a damper 78. The damper 78 connects an inside bottom surface of the cabinet 10 to an outer surface of the tub 20.

During a washing operation, the motor 40 rotates the drum 30 at low speed in forward and reverse directions, and thus stains on laundry are eliminated while the laundry within the drum 30 is continuously tumbled.

During a dehydration operation, when the motor 40 rotates the drum 30 at high speed in one direction, water is separated from laundry by centrifugal force acting on the laundry.

In the course of dehydration, when laundry is concentrated at a particular section in the drum 30 without being evenly distributed therein during rotation of the drum 30, the drum unstably rotates to thereby cause vibration and noise.

Accordingly, the washing machine 1 includes a balancer 100 to stabilize rotational motion of the drum 30.

Figure 2:
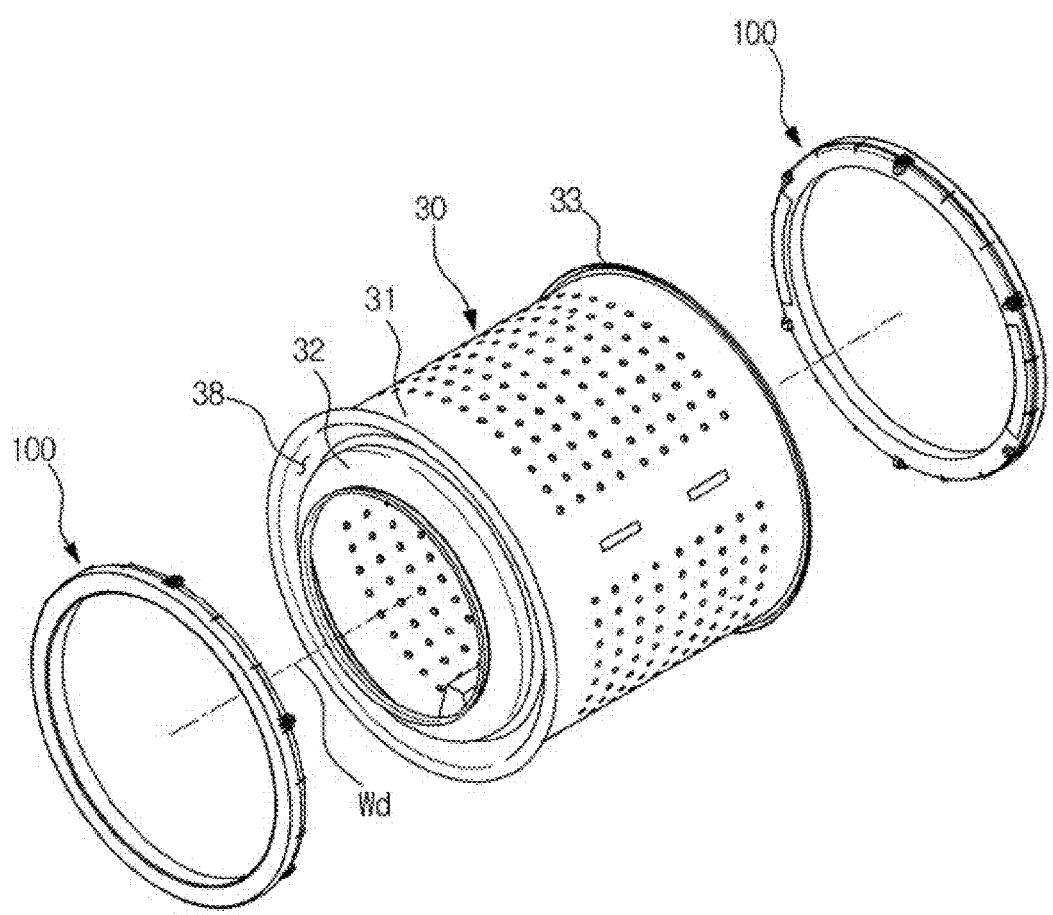
FIG. 2 is a separated perspective view of a drum and a balancer according to an embodiment of the present disclosure.
Figure 3:
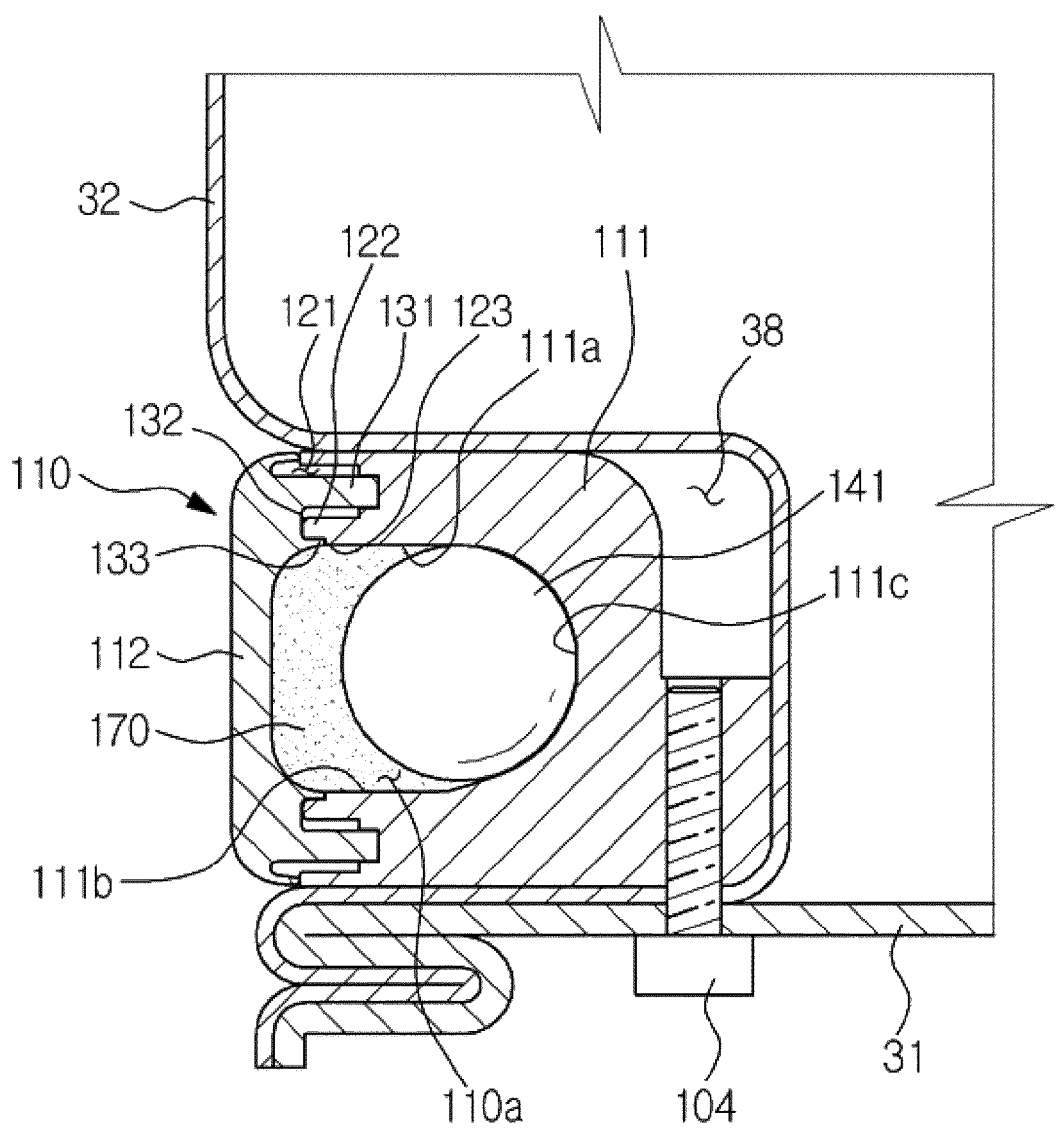
FIG. 3 is an enlarged view of portion "A" in FIG. 1.
Figure 4:
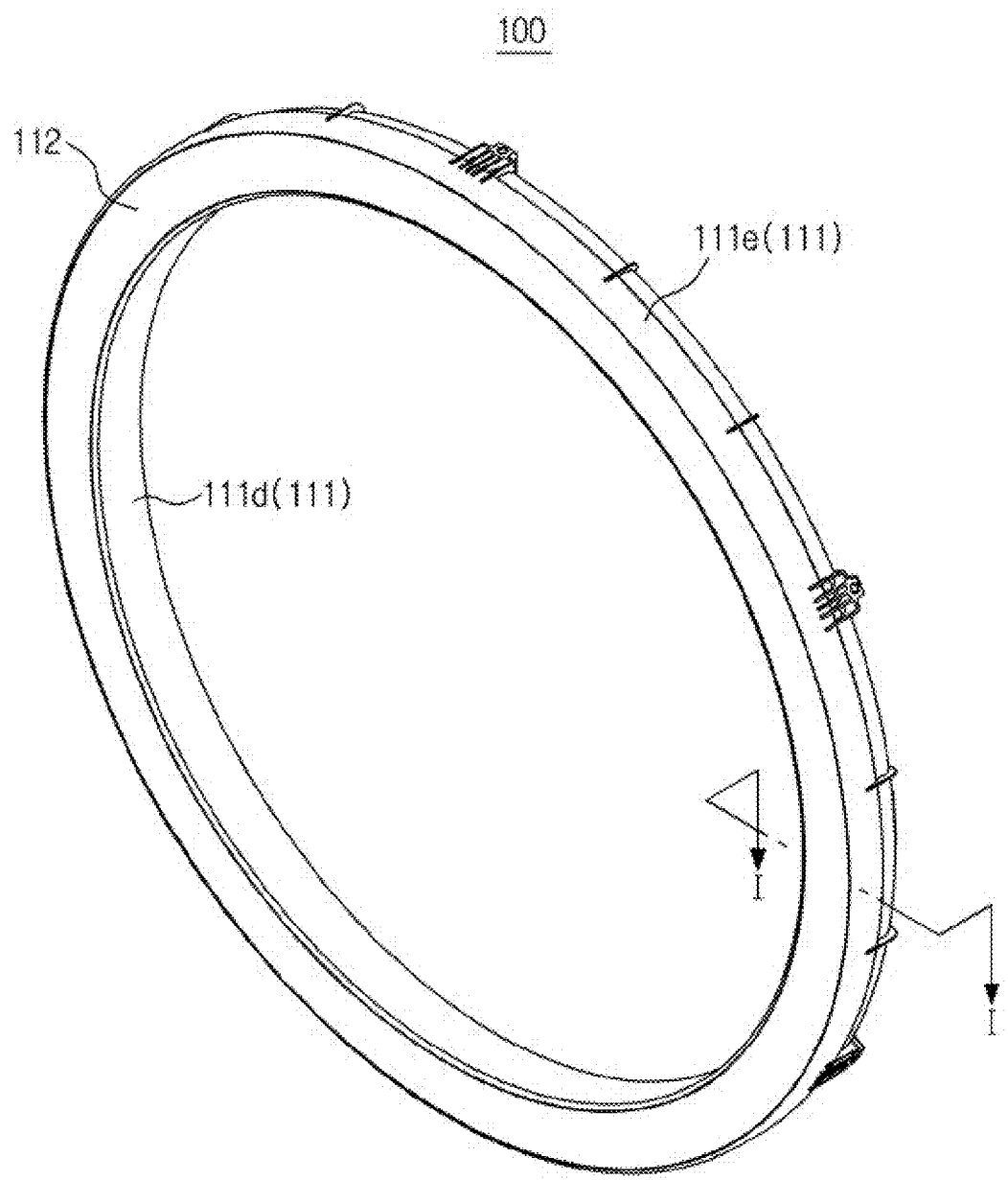
FIG. 4 is a perspective view illustrating the balancer according to the embodiment of the present disclosure.
Figure 5:
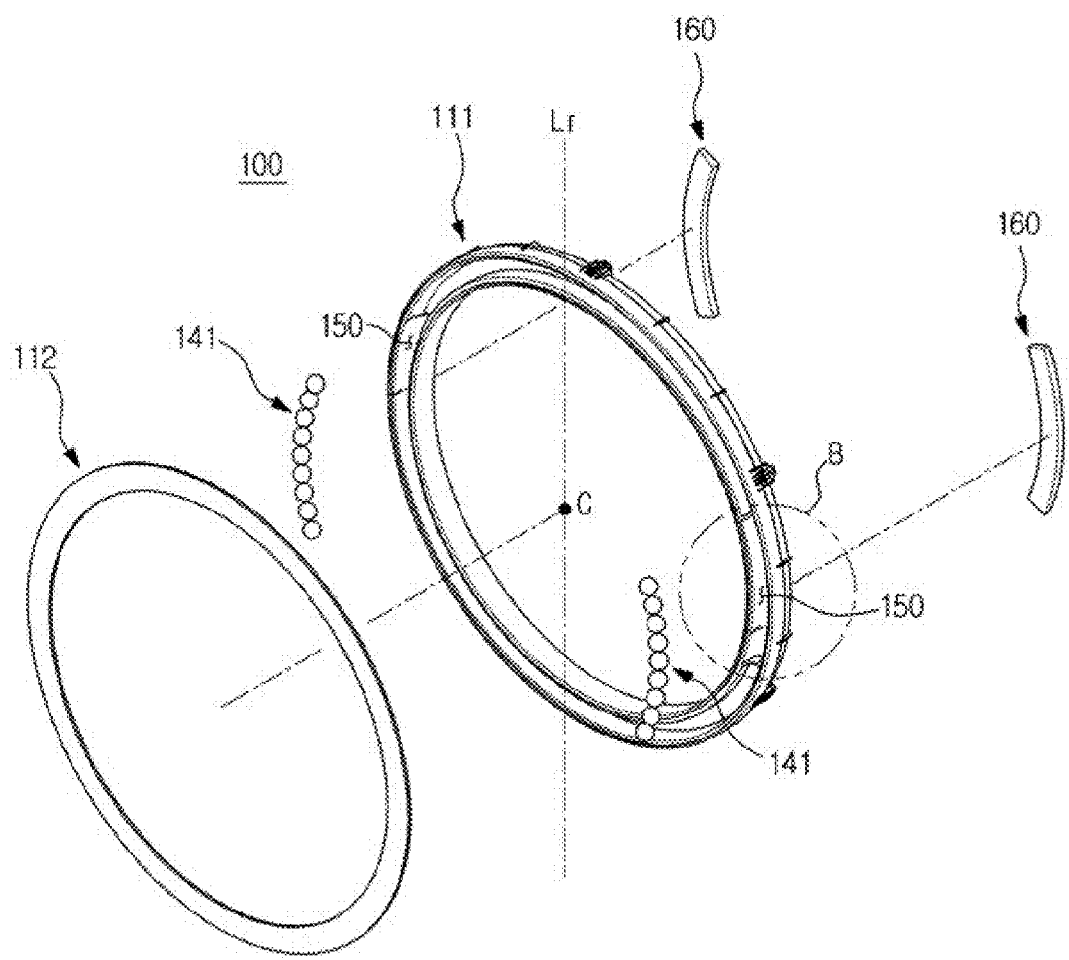
FIG. 5 is an exploded perspective view of the balancer shown in FIG. 4.
Figure 6:
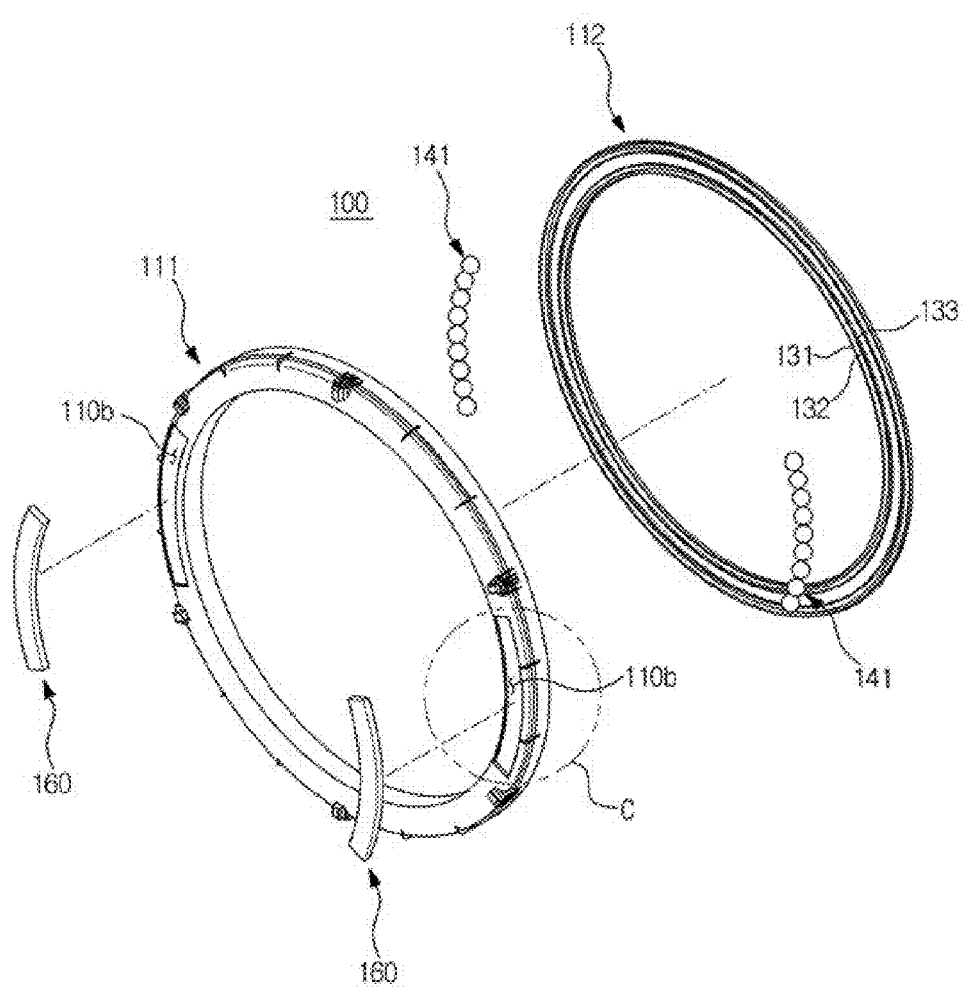
FIG. 6 is an exploded perspective view of the balancer in FIG. 5 when viewed from another angle.
Figure 7:
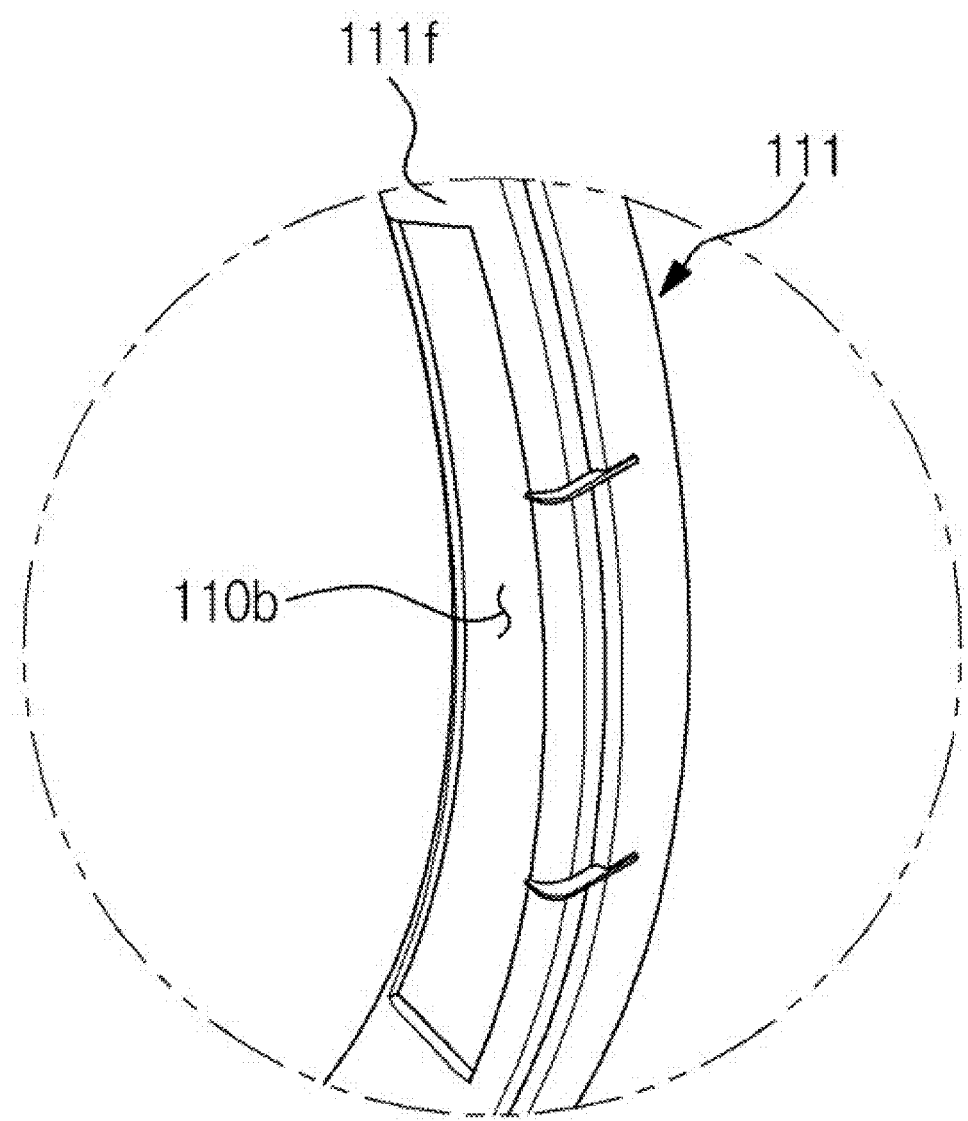
FIG. 7 is an enlarged view of portion "C" in FIG. 6.
Figure 8:
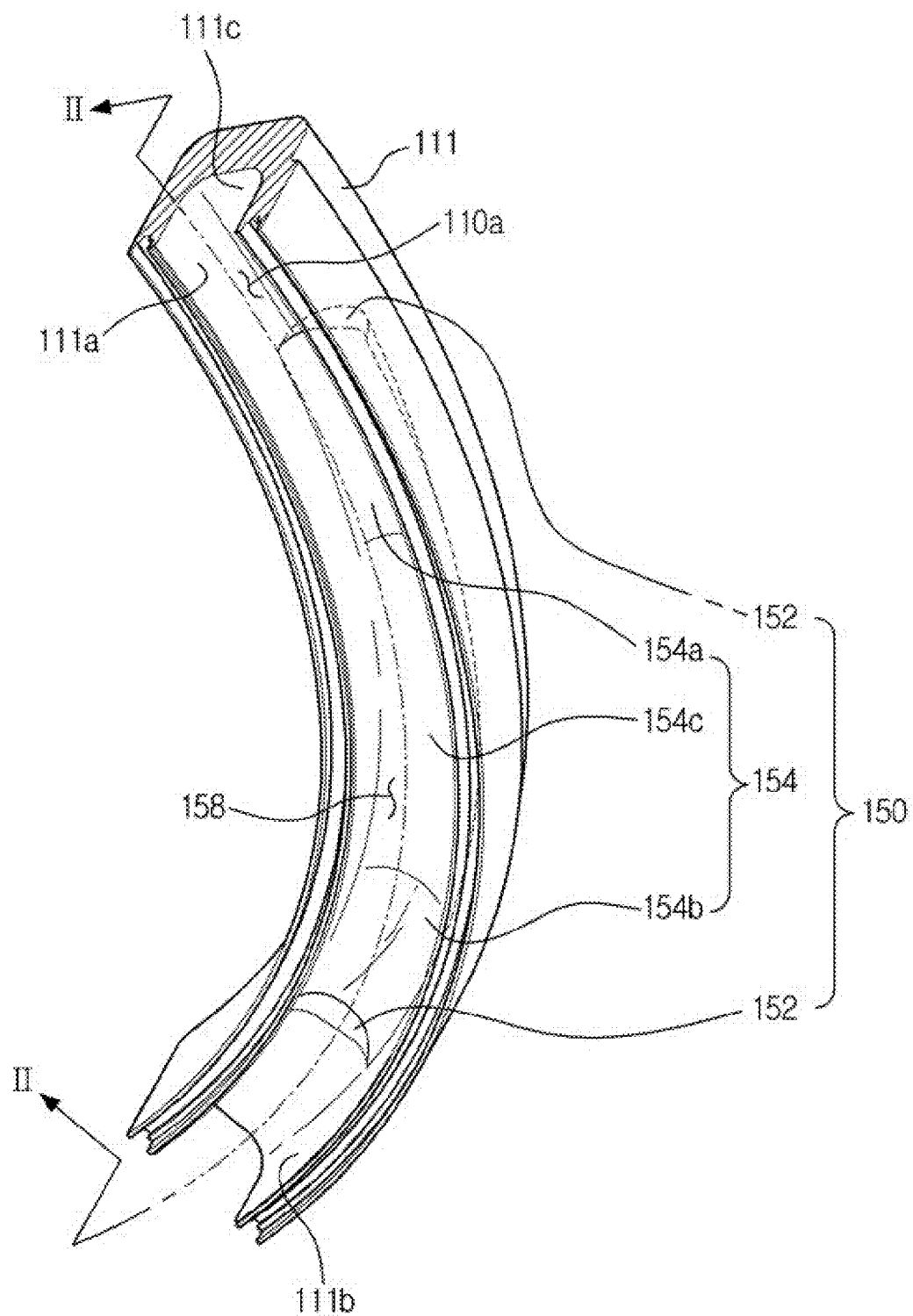
FIG. 8 is an enlarged view of portion "B" in FIG. 5.
Figure 9:
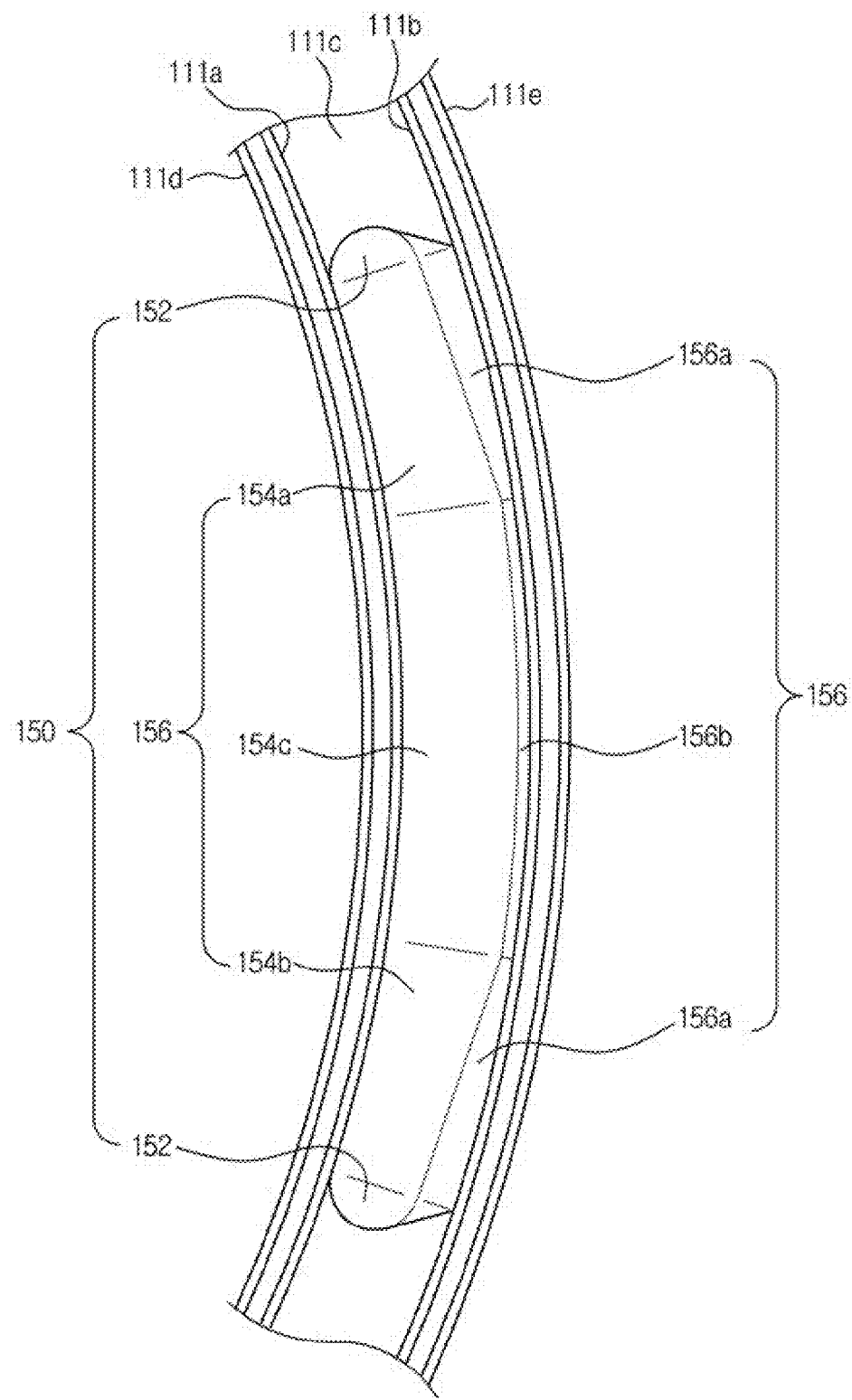
FIG. 9 is a front view of FIG. 8.
Figure 10:
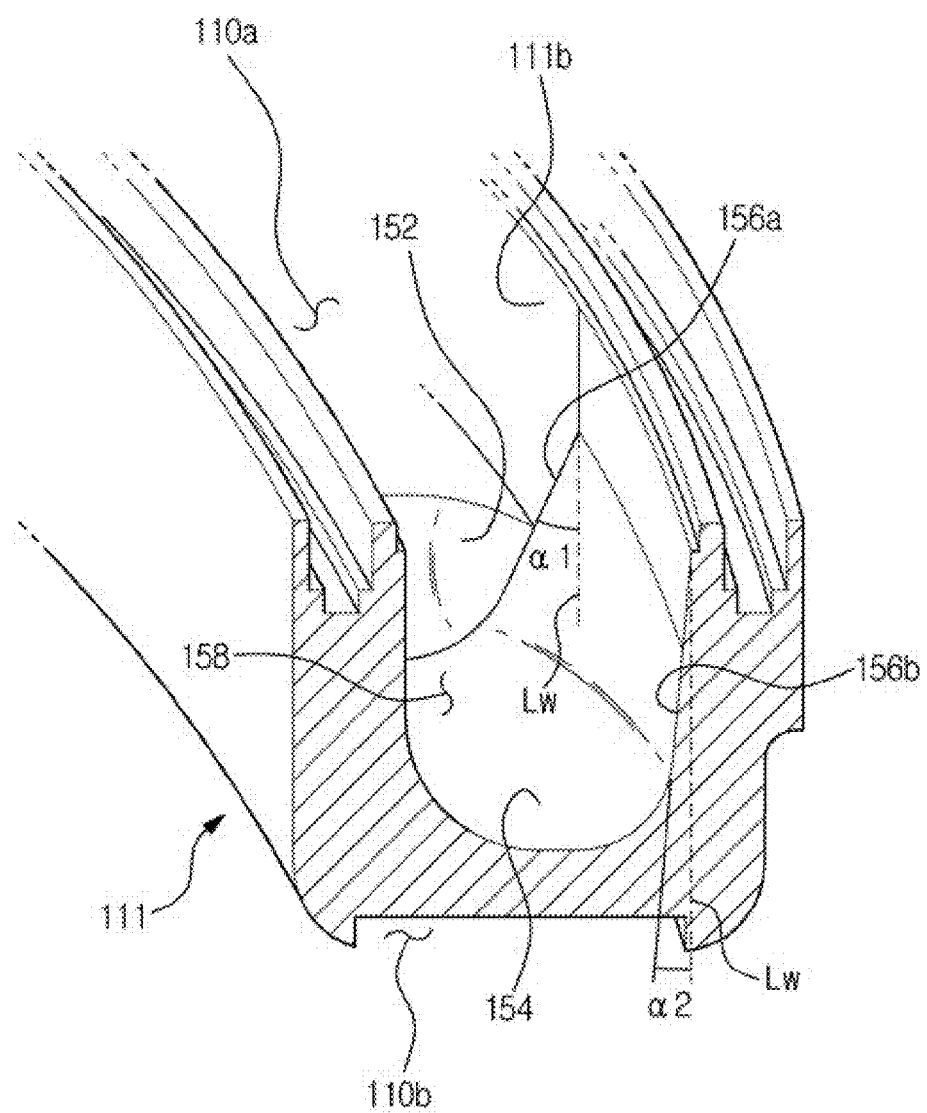
FIG. 10 is an enlarged view illustrating an inclined sidewall.
Figure 11:
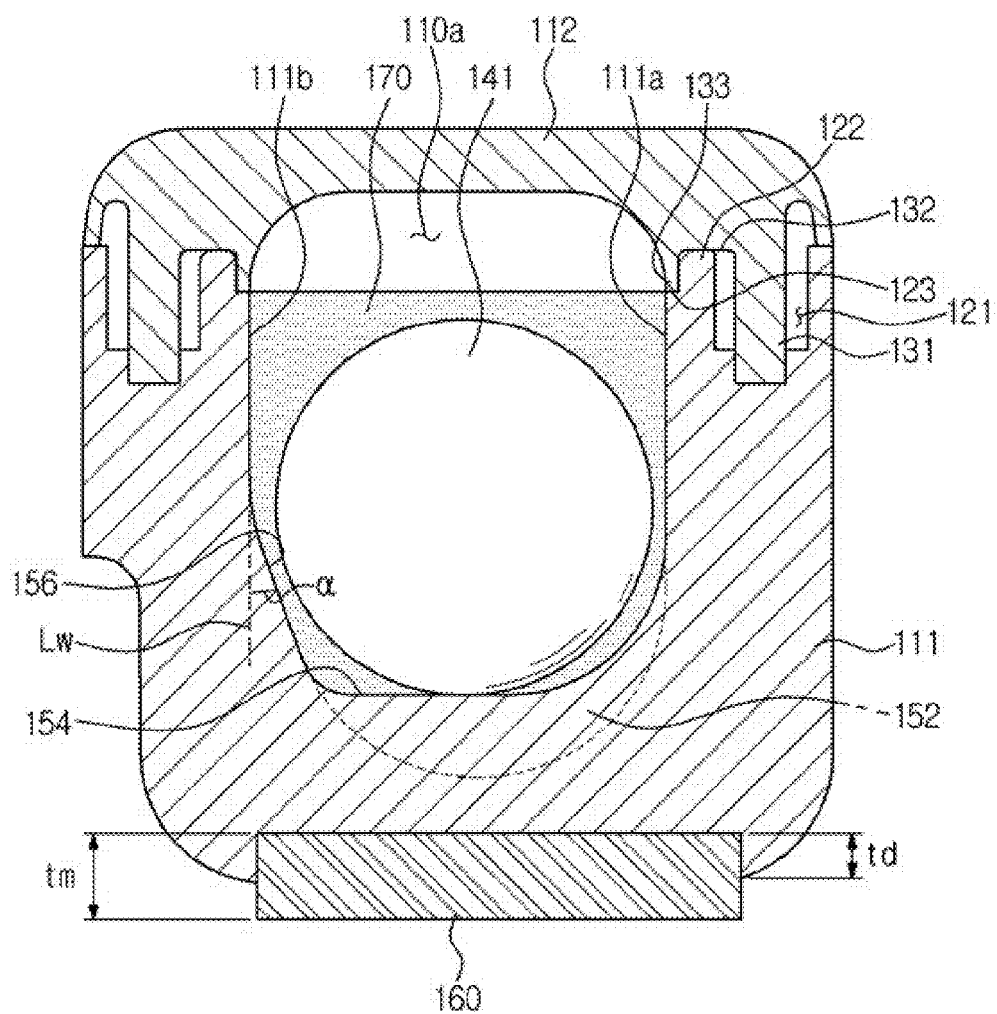
FIG. 11 is a cross-sectional view taken along line I-I in FIG. 4.
Figure 12:
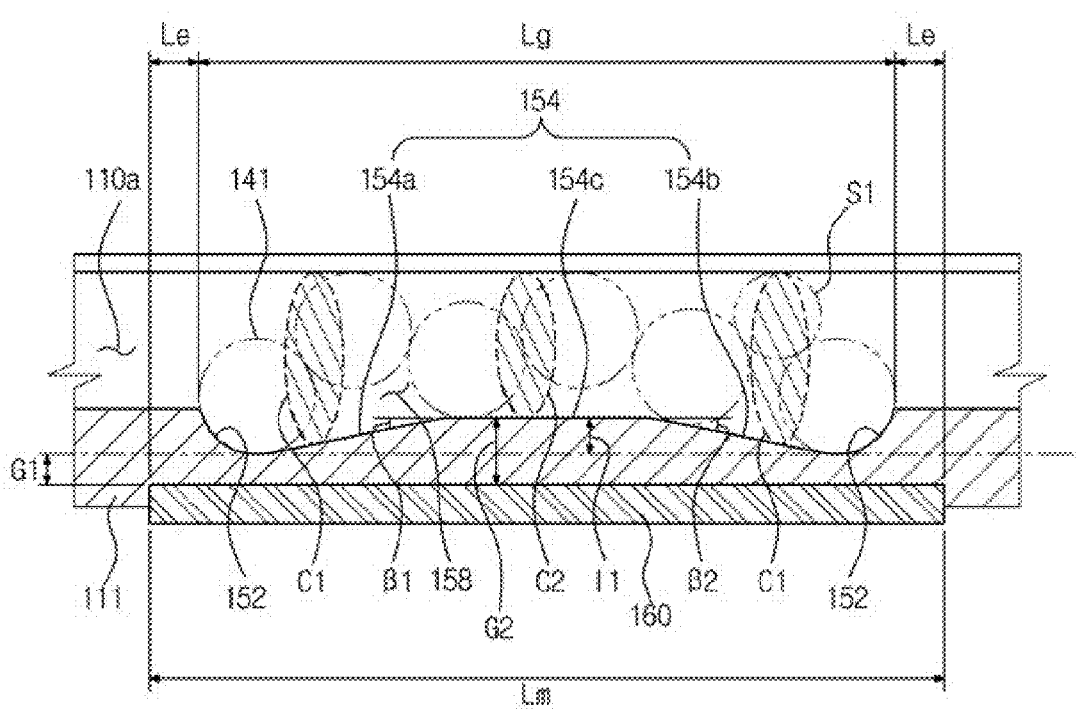
FIG. 12 is a cross-sectional view taken along line II-II in FIG. 8.

FIG. 2 is a separated perspective view of the drum and the balancer according to an embodiment of the present disclosure. FIG. 3 is an enlarged view of portion "A" in FIG. 1. FIG. 4 is a perspective view illustrating the balancer according to the embodiment of the present disclosure. FIG. 5 is an exploded perspective view of the balancer shown in FIG. 4. FIG. 6 is an exploded perspective view of the balancer in FIG. 5 when viewed from another angle. FIG. 7 is an enlarged view of portion "C" in FIG. 6. FIG. 8 is an enlarged view of portion "B" in FIG. 5. FIG. 9 is a front view of FIG. 8. FIG. 10 is an enlarged view illustrating an inclined sidewall. FIG. 11 is a cross-sectional view taken along line I-I in FIG. 4. FIG. 12 is a cross-sectional view taken along line II-II in FIG. 8.

The balancer 100 may be mounted to at least one of the front surface plate 32 and the rear surface plate 33 of the drum 30. Since the balancers 100 mounted to the front surface plate 32 and the rear surface plate 33 are equal to each other, a description will be given on the basis of the balancer 100 mounted to the front surface plate 32 below.

As shown in FIGS. 1 to 12, the balancer 100 includes a balancer housing 110 having an annular channel 110a, and a plurality of masses 141 arranged in the annular channel 110a and performing a balancing function of the drum 30 while moving along the annular channel 110a.

The front surface plate 32 of the drum 30 is formed with an annular recess 38 opened at the front thereof, and the balancer housing 110 is accommodated in the recess 38. The balancer housing 110 may be coupled to the drum 30 through a fixing member 104 so as to be securely fixed to the drum 30.

The balancer housing 110 includes an annular first housing 111 opened at one side thereof, and a second housing 112 to cover an opening portion of the first housing 111. The annular channel 110a is defined by an inner surface of the first housing 111 and an inner surface of the second housing 112. The first and second housings 111 and 112 may be made of a plastic material such as PP (polypropylene) or an ABS (acrylonitrile butadiene styrene) resin by injection molding, and may be coupled to each other via thermal bonding. Hereinafter, a front surface of the balancer housing 110 is defined as a surface exposed to the front thereof when the balancer housing 110 is coupled to the drum 30, a rear surface of the balancer housing 110 is defined as a surface which is opposite to the front surface of the balancer housing 110 and faces the front surface plate 32 of the drum 30 when the balancer housing 110 is coupled to the drum 30, and a side surface of the balancer housing 110 is defined as a surface which connects the front and rear surfaces of the balancer housing 110.

The first housing 111 has first coupling grooves 121 formed at both sides of the channel 110a, and the second housing 112 has a first coupling protrusion 131 coupled to each of the first coupling grooves 121. A second coupling protrusion 122 is formed between the first coupling groove 121 of the first housing 111 and the channel 110a. The second coupling protrusion 122 of the first housing 111 is coupled to a second coupling groove 132 formed at an inner side of the first coupling protrusion 131 of the second housing 112. A third coupling groove 123 is formed on an inside surface of the second coupling protrusion 122 adjacent to the channel 110a, and the second housing 112 has a third coupling protrusion 133 coupled to the third coupling groove 123. According to such a coupling structure, the first housing 111 may be securely coupled to the second housing 112, and when a damping fluid 170 such as oil is accommodated in the channel 110a, it may be possible to prevent leakage of the damping fluid 170.

The first housing 111 includes first and second inner surfaces 111a and 111b facing each other, and a third inner surface 111c connecting the first and second inner surfaces 111a and 111b. The first inner surface 111a is a surface corresponding to an inner peripheral surface 111d of the first housing 111, and the second inner surface 111b is a surface corresponding to an outer peripheral surface 111e of the first housing 111.

Grooves 150, on which the plural masses 141 are seated to temporarily restrict the masses 141, are formed on at least one of the first, second, and third inner surfaces 111a, 111b, and 111c. Although FIGS. 8 and 9 show a state in which one groove 150 is formed across the first and third inner surfaces 111a and 111c, the present disclosure is not limited thereto. For example, the groove 150 may also be formed on at least one of the first, second, and third inner surfaces 111a, 111b, and 111c, formed across the first and third inner surfaces 111a and 111c, or formed across all of the first, second, and third inner surfaces 111a, 111b, and 111c.

The grooves 150 may be symmetrically arranged on the basis of an imaginary line Lr which passes through a center of rotation of the drum 30 and is perpendicular to the ground so as not to cause an unbalanced load on the drum 30 due to the masses 141 in a state in which the masses 141 are seated and received on the grooves 150

Each of the grooves 150 is elongated in a circumferential direction of the balancer housing 110 so as to accommodate at least two masses 141. The groove 150 includes first support portions 152 to support the masses 141 in the substantially circumferential and radial direction of the balancer housing 110, a second support portion 154 provided between the first support portions 152 to support the masses 141 in the substantially radial direction of the balancer housing 110, inclined surfaces 154a and 154b which are obliquely formed inward of the channel 110a of the balancer housing 110, and at least one flat surface 154c provided between the inclined surfaces 154a and 154b.

The first support portions 152 are provided in a stepped shape at both ends of the groove 150 in order to prevent decoupling of the masses 141 from the groove 150 when an RPM of the drum 30 is within a specific RPM range.

The second support portion 154 is provided in a shape protruding inward of the channel 110a, and the inclined surfaces 154a and 154b and the flat surface 154c are provided in the second support portion 154. The inclined surfaces 154a and 154b include a first inclined surface 154a and a second inclined surface 154b with the flat surface 154c being interposed therebetween, and both ends of each of the first and second inclined surfaces 154a and 154b are respectively connected with each first support portion 152 and the flat surface 154c. A first inclined angle β1 defined by the flat surface 154c and the first inclined surface 154a may differ from a second inclined angle β2 defined by the flat surface 154c and the second inclined surface 154b. The second support portion 154 may have a length l1 between 1 mm and 3 mm, which protrudes inward of the channel.

The channel 110a includes a cross-section increasing portion 158 having an increased cross-section at a section formed with the groove 150. The cross-section increasing portion 158 is a space formed in the channel 110a by the groove 150. The cross-section increasing portion 158 may be provided in a shape corresponding to at least a portion of the masses 141, and be elongated in the circumferential direction of the balancer housing 110 so as to accommodate at least two masses 141 similarly to the groove 150. In addition, the cross-section increasing portions 158 may be symmetrically arranged on the basis of the imaginary line Lr passing through the center of rotation of the drum 30.

Due to the first inclined surface 154a, the second inclined surface 154b, and the flat surface 154c provided in the second support portion 154, a cross-sectional area C1 of both ends of the cross-section increasing portion 158 is greater than a cross-sectional area C2 between both ends of the cross-section increasing portion 158.

The second support portion 154 is provided in a shape protruding inward of the channel 110a, and therefore a clearance is generated between the masses 141 accommodated within the groove 150 or the cross-section increasing portion 158. Accordingly, since the masses 141 are smoothly decoupled from the groove 150 without being fixed to the groove 150 when an RPM of the drum 30 departs from a specific RPM range, a balancing function of the drum 30 may be performed while the masses 141 move along the channel 110a.

A rear surface 111f of the first housing 111 corresponding to the inner surface thereof formed with the groove 150 is provided with a magnet receiving groove 110b to receive and couple an associated magnet 160. The magnet receiving groove 110b may be provided in a shape corresponding to the magnet 160 such that the magnet 160 is coupled to the magnet receiving groove 110b. A depth td of the magnet receiving groove 110b may be equal to or smaller than a thickness tm of the magnet 160.

The magnet 160 is formed in an arc shape, and restricts the masses 141 such that no mass 141, which is coupled to the magnet receiving groove 110b and accommodated in the groove 150, is decoupled from the groove 150.

The magnet 160 may be fixed to the magnet receiving groove 110b using an adhesive (not shown) and the like. After a worker applies an adhesive to the magnet receiving groove 110b, the magnet 160 may be inserted into and fixed to the magnet receiving groove 110b.

The magnet 160 is not limited to be coupled to the rear surface of the balancer housing 110. For example, the magnet 160 may also be coupled to the front surface of the balancer housing 110 or the side surface connecting the front and rear surfaces of the balancer housing 110.

The magnet 160 restricts the masses 141 using magnetic force, and an intensity of magnetic force of the magnet 160 is determined depending upon an RPM of the drum 30 just as the masses 141 are decoupled from the groove 150. For instance, in order for the RPM of the drum 30 just as the masses 141 are decoupled from the groove 150 to become 200 RPM, the intensity of magnetic force of the magnet 160 may be adjusted in such a manner that the masses 141 are restricted so that no mass 141 accommodated in the groove 150 is decoupled from the groove when the RPM of the drum 30 is from 0 to 200 RPM, and the masses 141 are decoupled from the groove 150 when the RPM of the drum 30 exceeds 200 RPM. The intensity of magnetic force of the magnet 160 may be adjusted to a desired intensity by the size of the magnet 160, the number of the magnet 160, the magnetization method of the magnet 160, or the like.

As shown in FIG. 12, the magnet 160 is disposed at a position corresponding to the groove 150. A gap G1 between the magnet 160 and the groove 150 may be from 1 mm to 3 mm.

When the gap G1 between the magnet 160 and the groove 150 is smaller than 1 mm, the distance between the magnet 160 and the masses 141 becomes close to each other, and thus restrictive force of the magnet 160 with respect to the masses 141 is increased. Accordingly, the masses 141 are not decoupled from the groove 150 even when the RPM of the drum 30 exceeds a given RPM (for example, 200 RPM), so that a phenomenon in which balancing is not smoothly performed may be caused. In addition, in the process that the masses 141 are accommodated in the groove 150 by magnetic force of the magnet 160, the balancer housing 110 may be damaged by collision with the masses 141. Furthermore, in the process of injection molding of the balancer housing 110, periphery of the magnet receiving groove 110b receiving the magnet 160 may be not formed.

When the gap G1 between the magnet 160 and the groove is greater than 3 mm, the distance between the magnet 160 and the masses 141 becomes away from each other, and thus restrictive force of the magnet 160 with respect to the masses 141 is decreased. Accordingly, the masses 141 are decoupled from the groove 150 even when the RPM of the drum 30 is lower than a given RPM (for example, 200 RPM), so that this may cause an increase in unbalanced load within the drum 30. In addition, the thickness of the balancer housing 110 increases, and thus it may be disadvantaged in terms of compact and space utilization of the drum 30.

Meanwhile, the length l1 by which the second support portion 154 protrudes inward of the channel is from 1 mm to 3 mm. Therefore, when the gap G1 between the magnet 160 and the groove 150 is from 1 mm to 3 mm, a gap G2 between the magnet 160 and the flat surface 154c of the second support portion 154 is from 2 mm to 6 mm.

A length Lm of the magnet 160 is relatively longer than a length Lg of the groove 150, and the magnet 160 is coupled to the balancer housing 110 such that both ends of the magnet 160 protrude farther than both ends of the groove 150.

A length Le by which one end of the magnet 160 protrudes farther than one end of the groove 150 may be between 3 mm and 9 mm.

When the length Le by which one end of the magnet 160 protrudes farther than one end of the groove 150 is shorter than 3 mm, the restrictive force of the magnet 160 with respect to the masses 141 located at both ends of the groove 150 is decreased, a phenomenon in which only a portion of the masses 141 is decoupled from the groove 150 may be caused.

When the length Le by which one end of the magnet 160 protrudes farther than one end of the groove 150 is longer than 9 mm, the masses 141 may be restricted by the magnet 160 in a state in which the masses 141 are not accommodated in the groove 150 by the protruded portion of the magnet 160. Accordingly, the masses 141 of the same number are not distributed to the grooves 150 disposed at the symmetrical positions (see FIG. 5), so that this may cause an increase in unbalanced load within the drum 30.

An inclined sidewall 156 is provided on the second inner surface 111b corresponding to the first inner surface 111a.

The inclined sidewall 156 is configured of at least a portion of the second inner surface 111b connecting with groove 150. The inclined sidewall 156 makes an inclined angle α with an imaginary line Lw alongside of a rotation axis Wd of the drum 30, and supports the masses 141 accommodated in the groove 150 when the drum 30 rotates.

Figure 13:
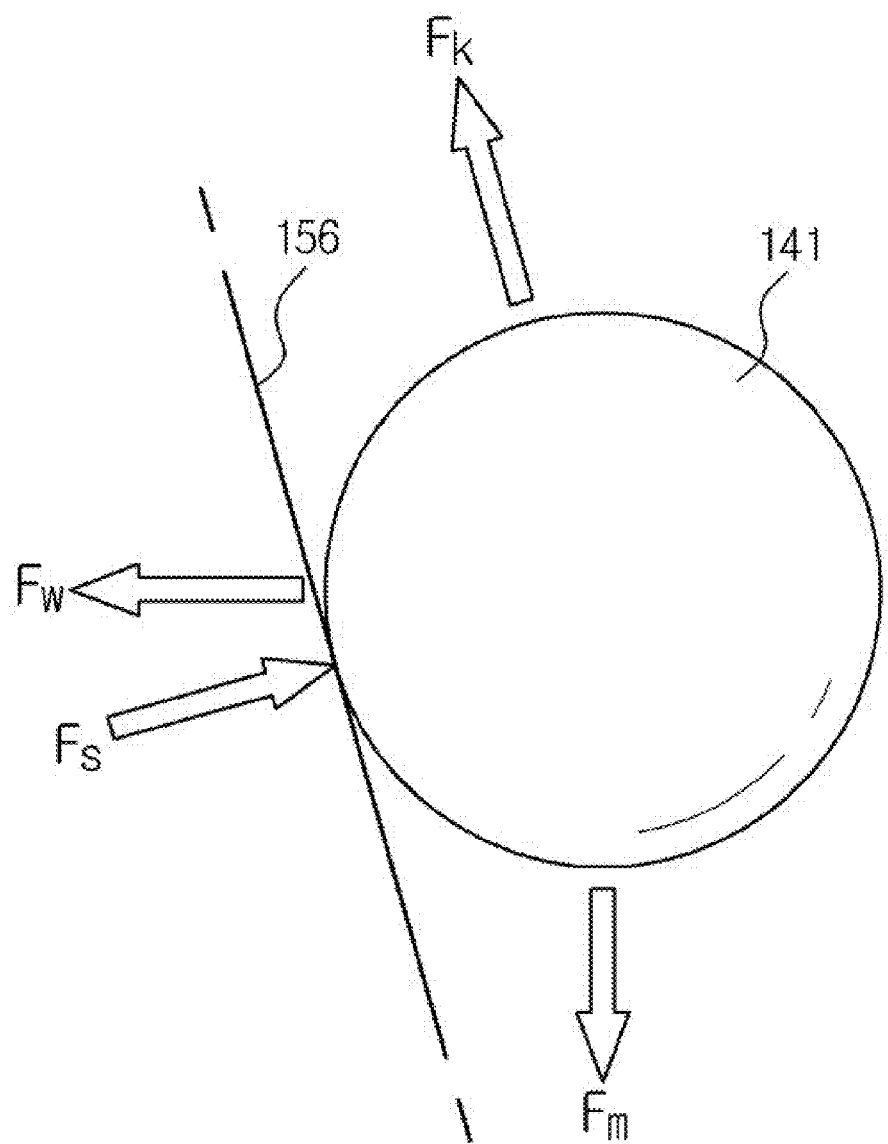
FIG. 13 is view for explaining a relationship between centrifugal force, magnetic force, and support force by the inclined sidewall.

As shown in FIG. 13, the inclined sidewall 156 generates support force Fs to support each mass 141 in a direction against centrifugal force Fw applied to the mass 141 when the drum 30 rotates.

The centrifugal force Fw applied to the mass 141 when the drum 30 rotates is offset by the support force Fs applied to the mass 141 by the inclined sidewall 156. Accordingly, magnetic force Fm generated by the magnet 160 coupled to the rear surface of the balancer housing 110 offsets only force remaining after being offset by the support force Fs applied to the mass 141 by the inclined sidewall 156 in the centrifugal force Fw of the mass 141, namely force Fk formed along the inclined sidewall 156, and thereby may restrict movement of the mass 141 when the RPM of the drum is within a specific RPM range.

As described above, by forming the inclined sidewall 156 on the second inner surface 111b corresponding to the first inner surface 111a and offsetting the centrifugal force Fw applied to the mass 141 during rotation of the drum 30 through the inclined sidewall 156, it may be possible to efficiently restrict and control the movement of the mass 141 using only the magnetic force Fm of small intensity.

The inclined angle α of the inclined sidewall 156 may be from about 5° to about 25°. The inclined angle α of the inclined sidewall 156 may be changed along the circumferential direction of the second inner surface 111b. The inclined angle α of the inclined sidewall 156 may also continuously increase or decrease along the circumferential direction of the second inner surface 111b.

As shown in FIG. 10, the inclined sidewall 156 includes first and second sections 156a and 156b having different inclined angles α1 and α2. The first sections 156a are arranged at positions corresponding to the first and second inclined surfaces 154a and 154b, and the second section 156b is arranged between the first sections 156a, namely at a position corresponding to the flat surface 154c of the groove 150. The inclined angle α1 of the inclined sidewall 156 in each first section 156a of the inclined sidewall 156 may be maintained at 25°, and the inclined angle α2 of the inclined sidewall 156 in the second section 156b may be maintained between an angle more than 5° and an angle less than 25°.

When the inclined angle α of the inclined sidewall 156 is changed, the direction of the support force Fs applied to the mass 141 by the inclined sidewall 156 is changed. Consequently, the direction and size of the force Fk formed along the inclined sidewall 156 are changed. When the inclined angle α of the inclined sidewall 156 is 0°, the centrifugal force Fw of the mass 141 is wholly offset by the support force Fs applied to the mass 141 by the inclined sidewall 156. Consequently, the force Fk formed along the inclined sidewall 156 becomes "0". When the inclined angle α of the inclined sidewall 156 is 90°, the support force Fs becomes "0" and the force Fk formed along the inclined sidewall 156 is maximized. When the inclined angle α of the inclined sidewall 156 is increased between 0° and 90°, the force Fk formed along the inclined sidewall 156 is increased. When the inclined angle α of the inclined sidewall 156 is decreased between 0° and 90°, the force Fk formed along the inclined sidewall 156 is decreased. In addition, the RPM of the drum 30 is proportional to the square of the centrifugal force Fw. Accordingly, when the RPM of the drum 30 is increased, the force Fk formed along the inclined sidewall 156 is increased, whereas when the RPM of the drum 30 is decreased, the force Fk formed along the inclined sidewall 156 is decreased.

The magnetic force Fm generated by the magnet 160 restricts the mass 141 by offsetting the force Fk formed along the inclined sidewall 156. Accordingly, as the inclined angle α of the inclined sidewall 156 is gradually increased, the Fk formed along the inclined sidewall 156 is gradually increased. Consequently, the mass 141 is decoupled from the groove 150 against the restrictive force by the magnetic force Fm at a relatively low RPM of the drum 30. On the contrary, as the inclined angle α of the inclined sidewall 156 is gradually decreased, the Fk formed along the inclined sidewall 156 is gradually decreased. Therefore, in order for the mass 141 to be decoupled from the groove 150 against the restrictive force by the magnetic force Fm, there is a need for a relatively high RPM of the drum 30.

As described above, the inclined angle of the first section 156a is greater than the second section 156b. Therefore, among the masses 141 accommodated in the groove 150, the masses 141, which are accommodated on the first inclined surfaces 154a of the groove 150 and supported by the first sections 156a, are decoupled from the groove 150 at a relatively low RPM of the drum 30, compared with the masses 141 which are accommodated on the flat surface 154c of the groove 150 and supported by the second section 156b. This means that the masses 141 accommodated in the groove 150 are decoupled from the groove 150 in the order of from the masses 141 disposed at both ends of the groove 150 to the masses 141 disposed at the center of the groove 150 during acceleration of the drum 30. Accordingly, it may be possible to prevent a phenomenon in which the masses 141 accommodated in the groove 150 are not smoothly decoupled from the groove 150 due to being caught in the groove 150 during acceleration of the drum 30.

Each of the masses 141 is made of a metal material in the form of a sphere. The mass 141 is movably disposed along the annular channel 110a in the circumferential direction of the drum 30 so as to offset an unbalanced load within the drum 30 during rotation of the drum 30. When the drum 30 is rotated, the centrifugal force acts on the mass 141 in a radial outward direction of the drum 30. In this state, the mass 141 decoupled from the groove 150 performs a balancing function of the drum 30 while moving along the channel 110a.

The mass 141 is accommodated in the first housing 111 before the first and second housings 111 and 112 are bonded to each other. The mass 141 may be accommodated and arranged in the balancer housing 110 through the course of bonding the first and second housings 111 and 112 in a state in which the mass 141 is accommodated in the first housing 111.

A damping fluid 170 is accommodated within the balancer housing 110 so that the mass 141 may be prevented from being suddenly moved.

The damping fluid 170 applies resistance to the mass 141 when the force acts on the mass 141, thereby preventing the mass 141 from being suddenly moved inside the channel 110a. The damping fluid 170 may be configured of oil. The damping fluid 170 partially performs a balancing function of the drum 30 together with the mass 141.

The damping fluid 170 is inserted into the first housing 111 together with the mass 141, and is then accommodated inside the balancer housing 110 through the course of bonding the first and second housings 111 and 112. However, the method of accommodating the damping fluid 170 inside the balancer housing 110 is not limited thereto. For example, after the first and second housings 111 and 112 are bonded to each other, the damping fluid 170 may also be accommodated inside the balancer housing 110 by the course of being injected into the balancer housing 110 through an injection hole (not shown) or the like formed on the first or second housing 111 or 112.

Hereinafter, the magnet 160 will be described in detail.

Figure 14A:
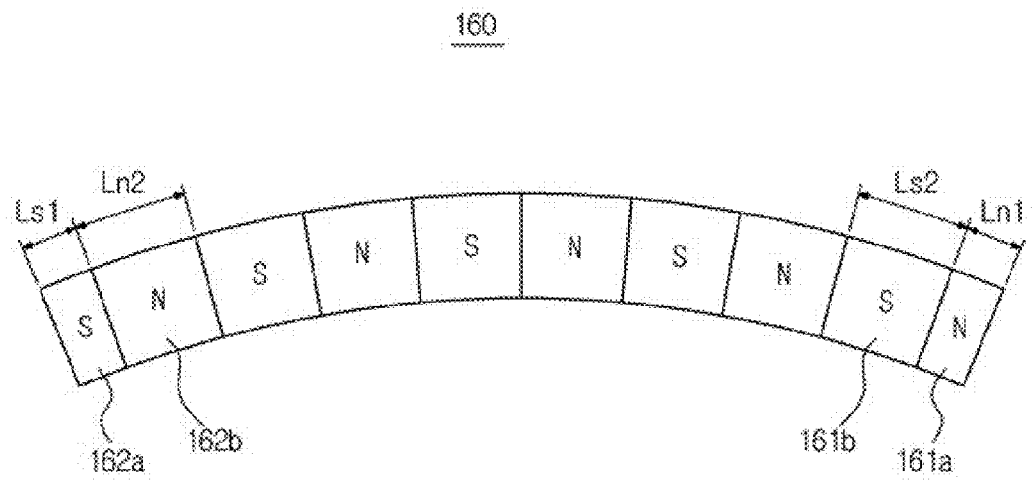
FIGS. 14A and 14B are views illustrating a magnet according to a first embodiment of the present disclosure.
Figure 14B:
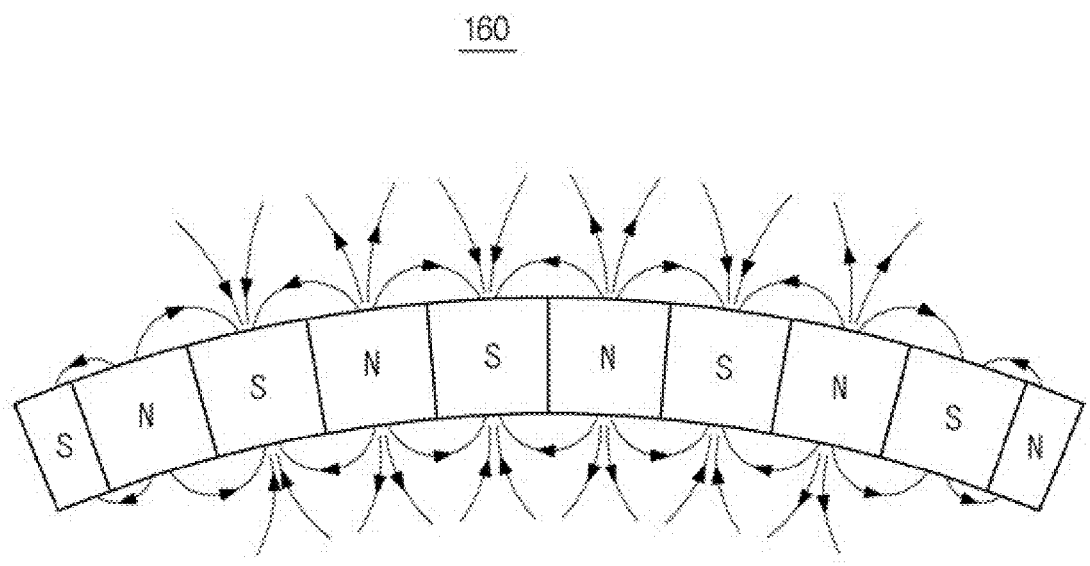
Figure 15A:
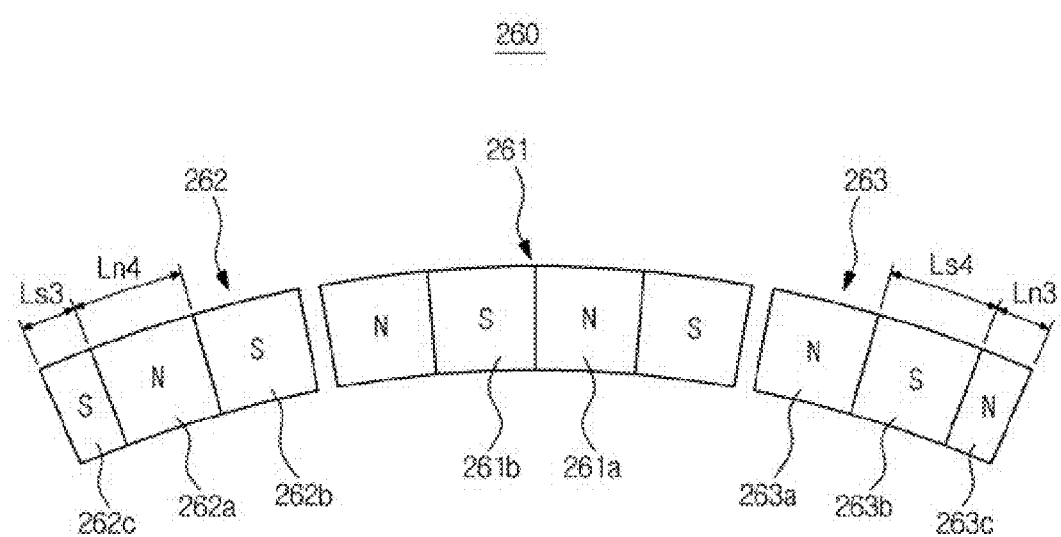
FIGS. 15A and 15B are views illustrating a magnet according to a second embodiment of the present disclosure.
Figure 15B:
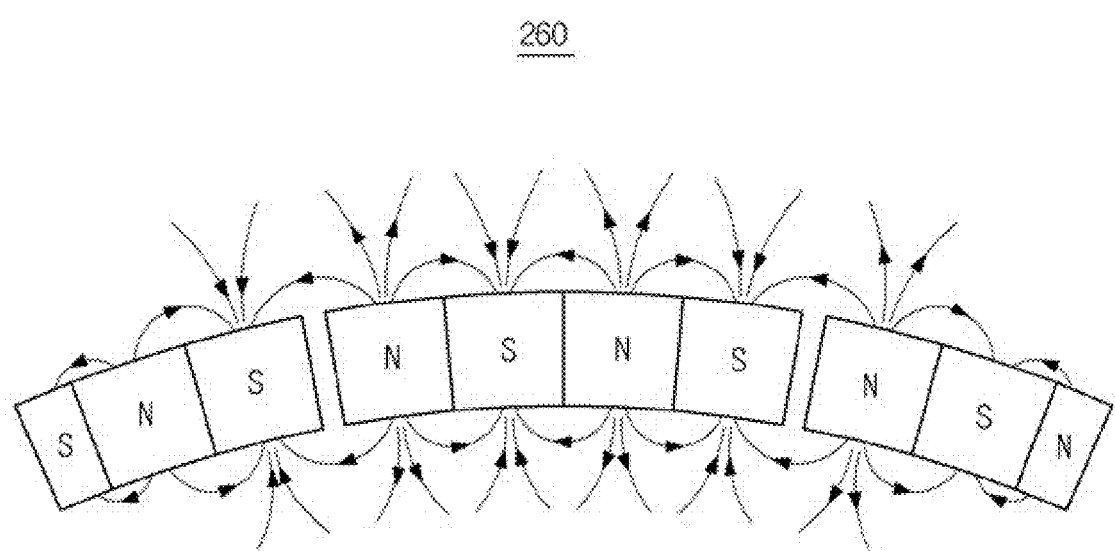

FIGS. 14A and 14B are views illustrating a magnet according to a first embodiment of the present disclosure. FIGS. 15A and 15B are views illustrating a magnet according to a second embodiment of the present disclosure. FIGS. 14B and 15B show lines of magnetic force around the magnet.

As shown in FIG. 14A, the magnet 160 is configured as a plurality of N poles and S poles which are arranged alternately.

A length Ln1 of the outermost N pole 161a and a length Ls1 of the outermost S pole 162a of the magnet 160 are shorter than a length Ls2 of an S pole 161b adjacent to the N pole 161a and a length Ln2 of an N pole 162b adjacent to the S pole 162a, respectively.

When the length of the outermost pole of the magnet 160 is shorter than the length of another adjacent pole, the effect of magnetic force is decreased on the outermost region of the magnet 160. Accordingly, it is possible to prevent a phenomenon in which the masses 141 are restricted in a state of being not accommodated in the groove 150 due to the magnetic force formed on the outermost region of the magnet 160.

Each of a ratio between the length Ln1 of the N pole 161a and the length Ls2 of the S pole 161b adjacent to the N pole 161a and a ratio between the length Ls1 of the S pole 162a and the length Ln2 of the N pole 162b adjacent to the S pole 162a may be between 1:3 to 2:3. Both of a ratio between the length Ln1 of the N pole 161a and a diameter of the mass 141, and a ratio between the length Ls1 of the S pole 162a and the diameter of the mass 141, may be between 1:0.6 to 1:1.4.

When the ratio between the length Ln1 of the N pole 161a and the length Ls2 of the S pole 161b adjacent to the N pole 161a or the ratio between the length Ls1 of the S pole 162a and the length Ln2 of the N pole 162b adjacent to the S pole 162a is smaller than 1:3, the effect of magnetic force is excessively decreased on the outermost region of the magnet 160. Consequently, since the restrictive force of the magnet 160 is decreased with respect to the masses 141 located at both ends of the groove 150, a phenomenon in which only a portion of the masses 141 is decoupled from the groove 150 may be caused.

When the ratio between the length Ln1 of the N pole 161a and the length Ls2 of the S pole 161b adjacent to the N pole 161a or the ratio between the length Ls1 of the S pole 162a and the length Ln2 of the N pole 162*b* adjacent to the S pole 162*a* is greater than 2:3, the effect of magnetic force is less decreased on the outermost region of the magnet 160. Therefore, a phenomenon in which the masses 141 are restricted in a state of being not accommodated in the groove 150 due to the magnetic force formed on the outermost region of the magnet 160 may be caused.

As shown in FIGS. 15A and 15B, a magnet 260 is configured as a plurality of divided magnets 261, 262, and 263 arranged to be spaced apart from each other in the circumferential direction of the balancer housing 110. The plural divided magnets 261, 262, and 263 include a first divided magnet 261, a second divided magnet 262, and a third divided magnet 263 which are disposed at both sides of the first divided magnet 261.

The first divided magnet 261 includes N poles 261*a* and S poles 261*b* having the same length as each other. The second divided magnet 262 includes an N pole 262*a* and an S pole 262*b* having the same length as each other, and an S pole 262*c* having a shorter length than the N pole 262*a*. The third divided magnet 263 includes an N pole 263*a* and an S pole 263*b* having the same length as each other, and an N pole 263*c* having a shorter length than the S pole 263*b*.

A length Ls3 of the outermost S pole 262*c* of the second divided magnet 262 is shorter than a length Ln4 of an N pole 262*a* adjacent to the S pole 262*c*. A ratio between the length Ls3 of the S pole 262*c* and the length Ln4 of the N pole 262*a* may be between 1:3 to 2:3.

A length Ln3 of the outermost N pole 263*c* of the third divided magnet 263 is shorter than a length Ls4 of an S pole 263*b* adjacent to the N pole 263*c*. A ratio between the length Ln3 of the N pole 263*c* and the length Ls4 of the S pole 263*b* may be between 1:3 to 2:3.

Since an effect by the length Ls3 of the outermost S pole 262*c* of the second divided magnet 262 being shorter than the length Ln4 of the N pole 262*a* adjacent to the S pole 262*c* and an effect by the length Ln3 of the outermost N pole 263*c* of the third divided magnet 263 being shorter than the length Ls4 of the S pole 263*b* adjacent to the N pole 263*c* are the same as the above-mentioned magnet 160 according to the embodiment of the present disclosure, the description thereof will be omitted.

Figure 16A:
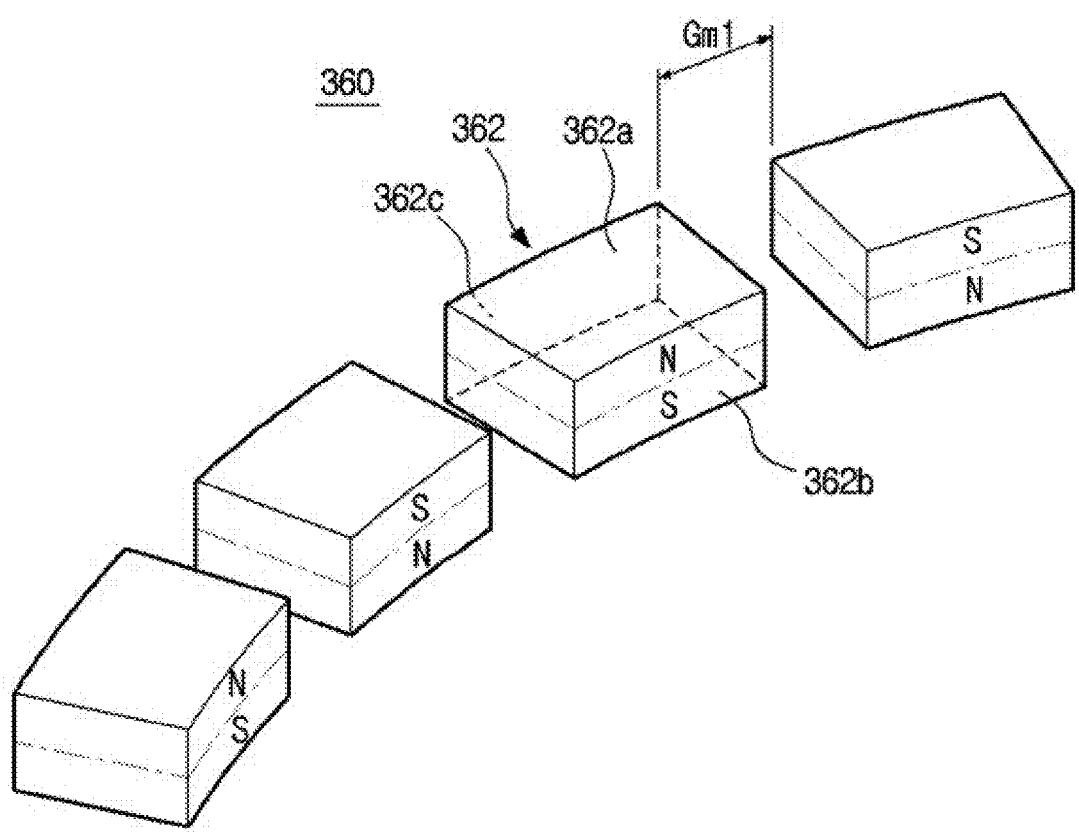
FIG. 16A is a view illustrating a magnet according to a third embodiment of the present disclosure.
Figure 16B:
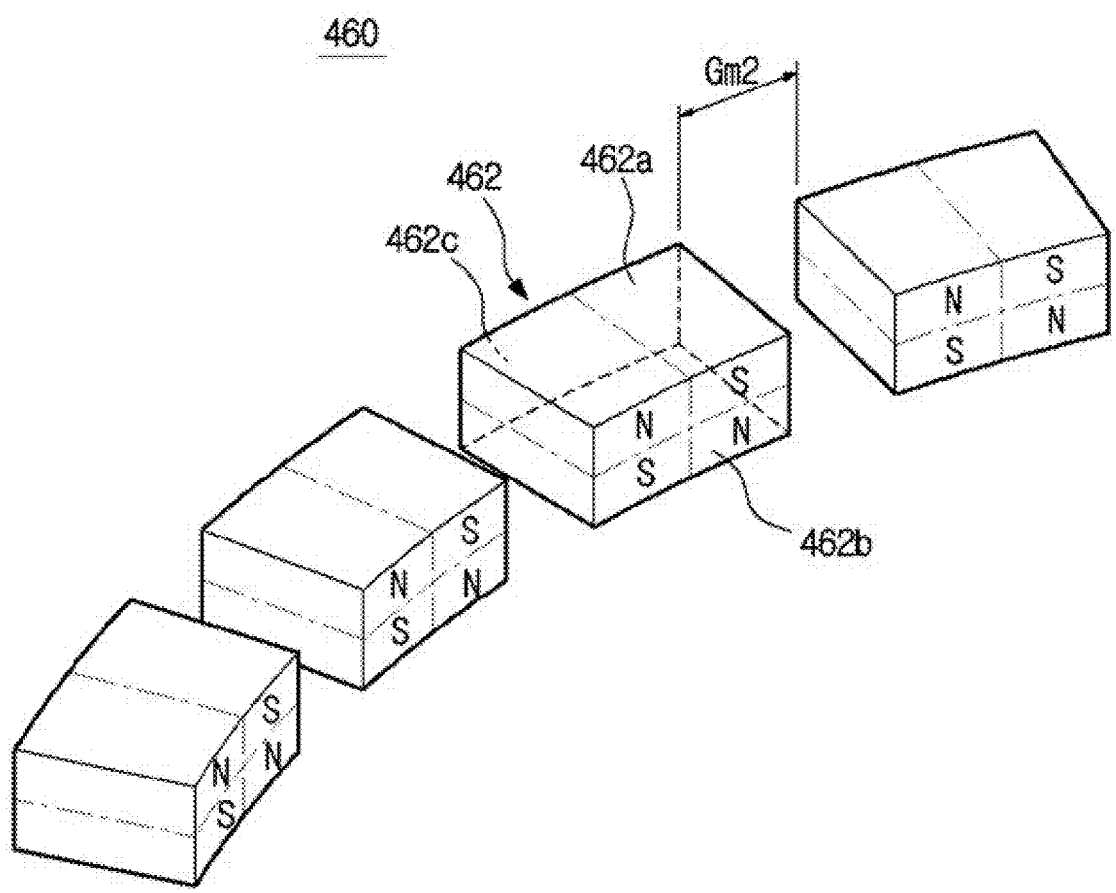
FIG. 16B is a view illustrating a magnet according to a fourth embodiment of the present disclosure.
Figure 16C:
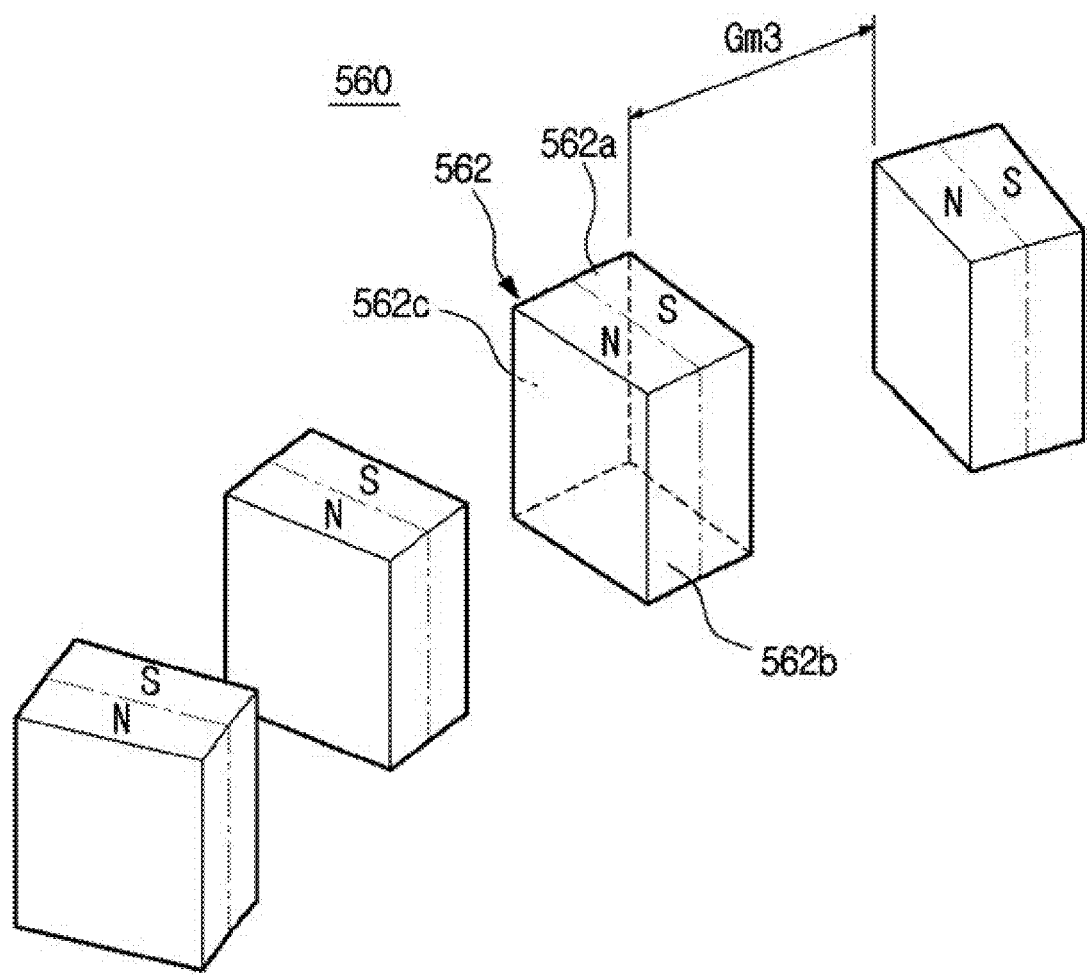
FIG. 16C is a view illustrating a magnet according to a fifth embodiment of the present disclosure.

FIG. 16A is a view illustrating a magnet according to a third embodiment of the present disclosure. FIG. 16B is a view illustrating a magnet according to a fourth embodiment of the present disclosure. FIG. 16C is a view illustrating a magnet according to a fifth embodiment of the present disclosure.

As shown in FIG. 16A, a magnet 360 may include a plurality of unit magnets 362 arranged in the circumferential direction of the balancer housing 110. The unit magnets 362 each have a pair of N and S poles, and are spaced apart from each other in the circumferential direction of the balancer housing 110. The pair of N and S poles is arranged in a direction parallel with the rotation axis Wd of the drum 30.

Each of the unit magnets 362 includes a contact surface 362*a* coming into contact with the rear surface of the first housing 111, and an inside surface 362*b* and an outside surface 362*c* which are formed in an arc shape. The inside surface 362*b* and the outside surface 362*c* may also be formed in shapes such as a plane shape other than the arc shape.

As shown in FIG. 16B, a magnet 460 may include a plurality of unit magnets 462 arranged in the circumferential direction of the balancer housing 110. The plural unit magnets 462 each have a plurality of N poles and S poles, and are spaced apart from each other in the circumferential direction of the balancer housing 110.

Each of the unit magnets 462 includes a contact surface 462*a* coming into contact with the rear surface of the first housing 111, and an inside surface 462*b* and an outside surface 462*c* which are formed in an arc shape. The inside surface 462*b* and the outside surface 462*c* may also be formed in shapes such as a plane shape other than the arc shape.

As shown in FIG. 16C, a magnet 560 may include a plurality of unit magnets 562 arranged in the circumferential direction of the balancer housing 110. The unit magnets 562 each have a pair of N and S poles, and are spaced apart from each other in the circumferential direction of the balancer housing 110. The pair of N and S poles is arranged in the circumferential direction of the balancer housing 110.

Each of the unit magnets 562 includes a contact surface 562*a* coming into contact with the rear surface of the first housing 111, and an inside surface 562*b* and an outside surface 562*c* which are formed in an arc shape. The inside surface 562*b* and the outside surface 562*c* may also be formed in shapes such as a plane shape other than the arc shape.

An intensity of magnetic force of each of the magnets 360, 460, and 560 may be adjusted to a desired intensity by setting each gap between the unit magnets 362, 462, and 562. Since density of lines of magnetic force is decreased as the gaps Gm1, Gm2, and Gm3 between the respective unit magnets 362, 462, and 562 are increased, the intensities of magnetic force of the magnets 360, 460, and 560 are decreased. On the other hand, since density of lines of magnetic force is increased as the gaps Gm1, Gm2, and Gm3 between the respective unit magnets 362, 462, and 562 are decreased, the intensities of magnetic force of the magnets 360, 460, and 560 are increased.

As described above, the intensities of magnetic force of the magnets 360, 460, and 560 are directly concerned with the RPM of the drum 30 (for example, 200 RPM) when the masses 141 accommodated in the groove 150 are decoupled from the groove 150. Accordingly, it may be possible to regulate the RPM of the drum 30 when the masses 141 accommodated in the groove 150 are decoupled from the groove 150 by adjusting the gaps Gm1, Gm2, and Gm3 between the respective unit magnets 362, 462, and 562.

Figure 17:
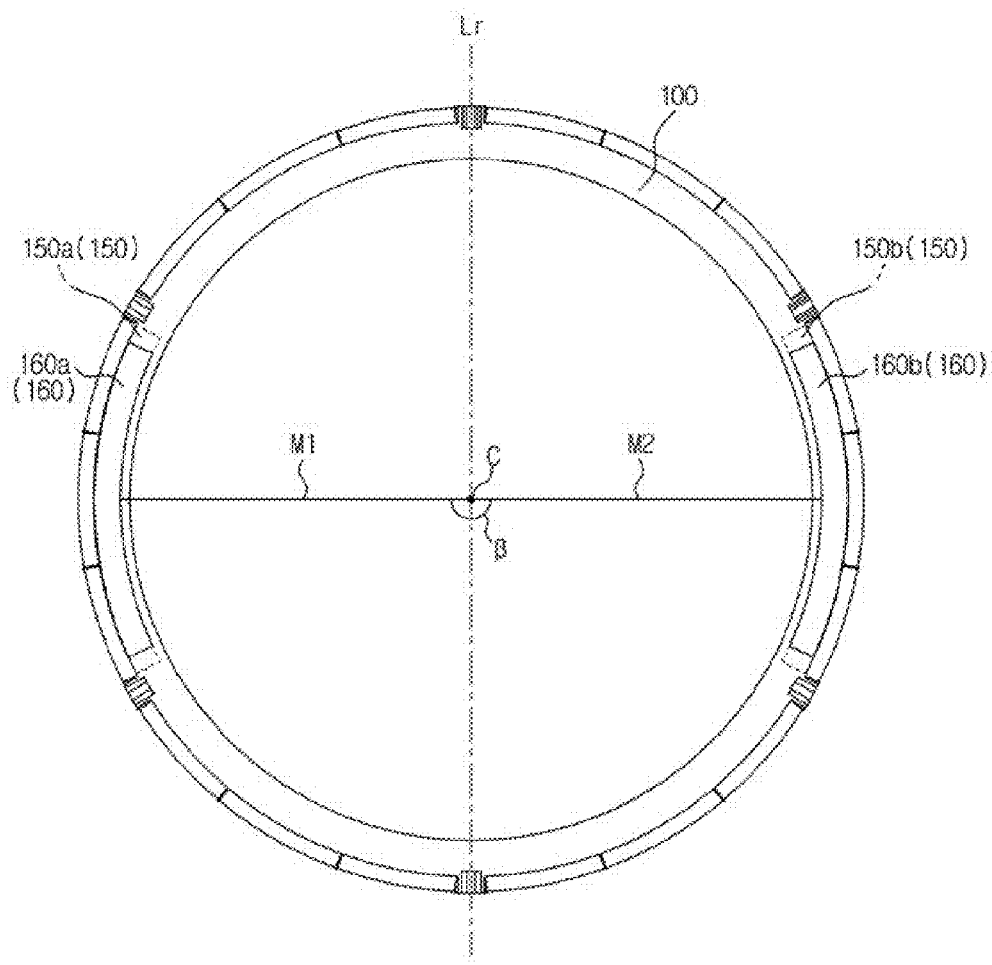
FIG. 17 is a view illustrating a structure in which magnets are placed on a balancer housing.

FIG. 17 is a view illustrating a structure in which the magnets are placed on the balancer housing. FIG. 17 shows a state of the balancer housing when viewed from the rear.

As shown in FIG. 17, the magnets 160 are disposed at respective positions corresponding to the grooves 150. The magnets 160 include a pair of first and second magnets 160*a* and 160*b* coupled to the rear surface of the balancer housing 110.

The first and second magnets 160*a* and 160*b* may be arranged such that an angle β made by a first vertical line M1 which vertically connects the first magnet 160*a* and the center C of rotation of the drum 30 and a second vertical line M2 which vertically connects the second magnet 160*b* and the center C of rotation of the drum 30 is from 150° to 210°. In addition, the and second magnets 160*a* and 160*b* may be arranged such that the angle β made by the first vertical line M1 and the second vertical line M2 becomes 180°. When the angle β made by the first vertical line M1 and the second vertical line M2 is 180°, the first and second magnets 160*a* and 160*b* are symmetrically arranged on the basis of the imaginary line Lr which passes through the center of rotation of the drum 30 and is perpendicular to the ground.

As described above, in a case where the number of the magnet 160 is three or more in a condition that the masses 141 may be restricted by the magnets 160 because an RPM of the drum 30, for example, does not exceed 200 RPM, when the masses 141 are caught between two adjacent magnets 160 in the course of being restricted, the masses 141 are not moved to the residual magnets 160. Thus, the masses 141 are not evenly distributed to the balancer housing 110, thereby enabling an unbalanced load to be caused on the drum 30.

In a case where the pair of magnets 160 are symmetrically arranged on the basis of the imaginary line Lr which passes through the center of rotation of the drum 30, when the masses 141 are wholly accommodated in any one groove 150a, a mass 141 which is not accommodated in any one groove 150a may be naturally accommodated in the other groove 150b and be restricted by the magnets 160 during rotation of the drum 30. Accordingly, a phenomenon in which the masses 141 are not evenly distributed to the balancer housing 110 may be prevented.

Hereinafter, a principle will be described in which the masses 141 are restricted by the groove and the magnet 160 when an RPM of the drum 30 is within a specific RPM range and the masses 141 are decoupled from the groove and perform a balancing function of the drum 30 when an RPM of the drum 30 departs from a specific RPM range.

Figure 18:
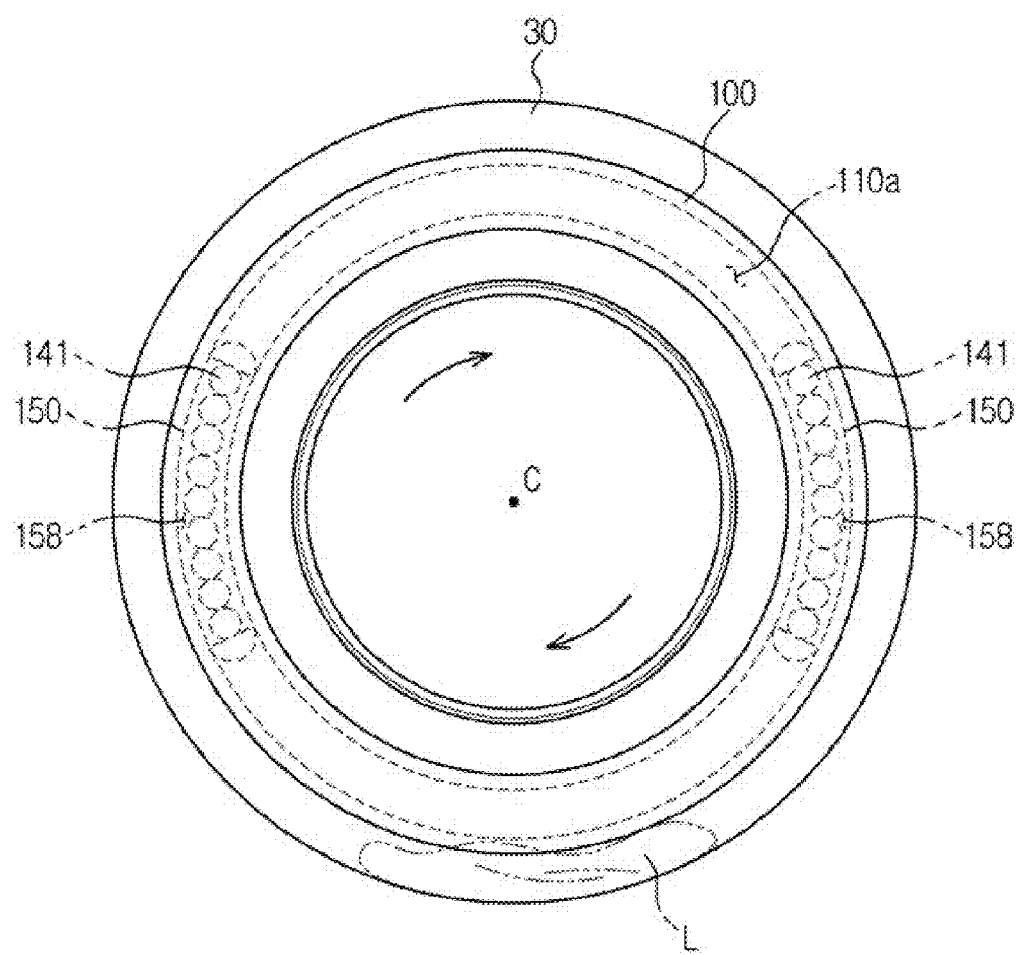
FIGS. 18 and 19 are views illustrating an operation principle of the balancer according to the embodiment of the present disclosure.
Figure 19:
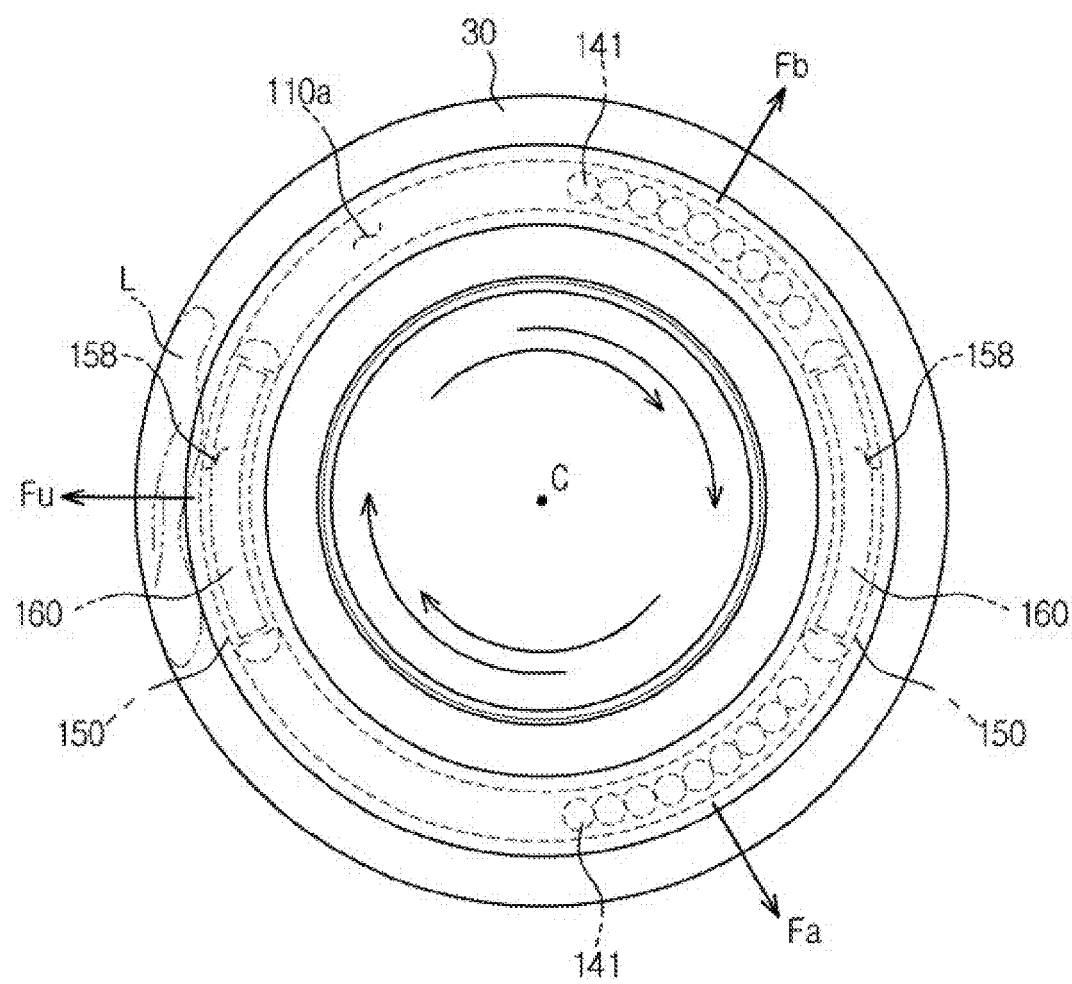

FIGS. 18 and 19 are views illustrating an operation principle of the balancer according to the embodiment of the present disclosure. The damping fluid 170 is omitted in FIGS. 18 and 19.

As shown in FIG. 18, during initial dehydration of laundry, when an RPM of the drum 30 is within a specific RPM range, the masses 141 are accommodated in the groove 150 or the cross-section increasing portion 158 and movement of the masses 141 is restricted by the magnets 160.

Before dehydration begins, i.e., the drum 30 rotates, the masses 141 are wholly arranged at the bottom of the balancer housing 110 by gravity. In such a state, when the dehydration begins and the drum 30 rotates, the centrifugal force acts on the masses 141 so that the masses 141 move along the channel 110a of the balancer housing 110 to be accommodated and seated in the groove 150 in the course of moving along the channel 110a of the balancer housing 110. The movement of the masses 141 accommodated and seated in the groove 150 is restricted by the magnetic force of the magnets 160 until an RPM of the drum 30 does not depart from a specific RPM range. For example, if the washing machine is designed such that the centrifugal force applied to the masses 141 by rotation of the drum 30, the force by gravity of the masses 141, the magnetic force by the magnets 160, and the force supporting the masses 141 are balanced to each other when the RPM of the drum 30 is 200 RPM, the movement of the masses 141 is restricted in a state in which the masses 141 are accommodated and seated in the groove 150 when the RPM of the drum 30 is within a range between 0 and 200 RPM during initial dehydration of laundry. Thus, during initial dehydration of laundry, by restricting the movement of the masses 141 when the drum 30 rotates at relatively low speed, it may be possible to prevent a phenomenon in which the masses 141 generate vibration of the drum 30 together with laundry L or the vibration generated by the laundry L is increased. In addition, it may be possible to reduce noise by vibration of the drum 30.

As shown in FIG. 19, when an RPM of the drum 30 departs from a specific RPM range, the masses 141 accommodated and restricted in the groove 150 or the cross-section increasing portion 158 are decoupled from the groove 150 or the cross-section increasing portion 158 and perform a balancing function of the drum 30 while moving along the channel 110a of the balancer housing 110.

For example, if the washing machine is designed such that the centrifugal force applied to the masses 141 by rotation of the drum 30, the force by gravity of the masses 141, the magnetic force of the magnets 160, and the force supporting the masses 141 by the groove 150 are balanced to each other when the RPM of the drum 30 is 200 RPM, the centrifugal force applied to the masses 141 is increased when the RPM of the drum 30 exceeds 200 RPM. Therefore, the masses 141 are decoupled from the groove 150 or the cross-section increasing portion 158 and move along the channel 110a of the balancer housing 110. In such a process, the masses 141 are controlled so as to move through sliding and rolling toward a position offsetting an unbalanced load Fu caused by the drum 30 due to the bias of the laundry L, namely toward a side opposite to the acting direction of an unbalanced load Fu, thereby generating forces Fa and Fb offsetting the unbalanced load Fu. As a result, it may be possible to stabilize the rotational motion of the drum 30.

Modified embodiments of the groove will be described below.

Figure 20A:
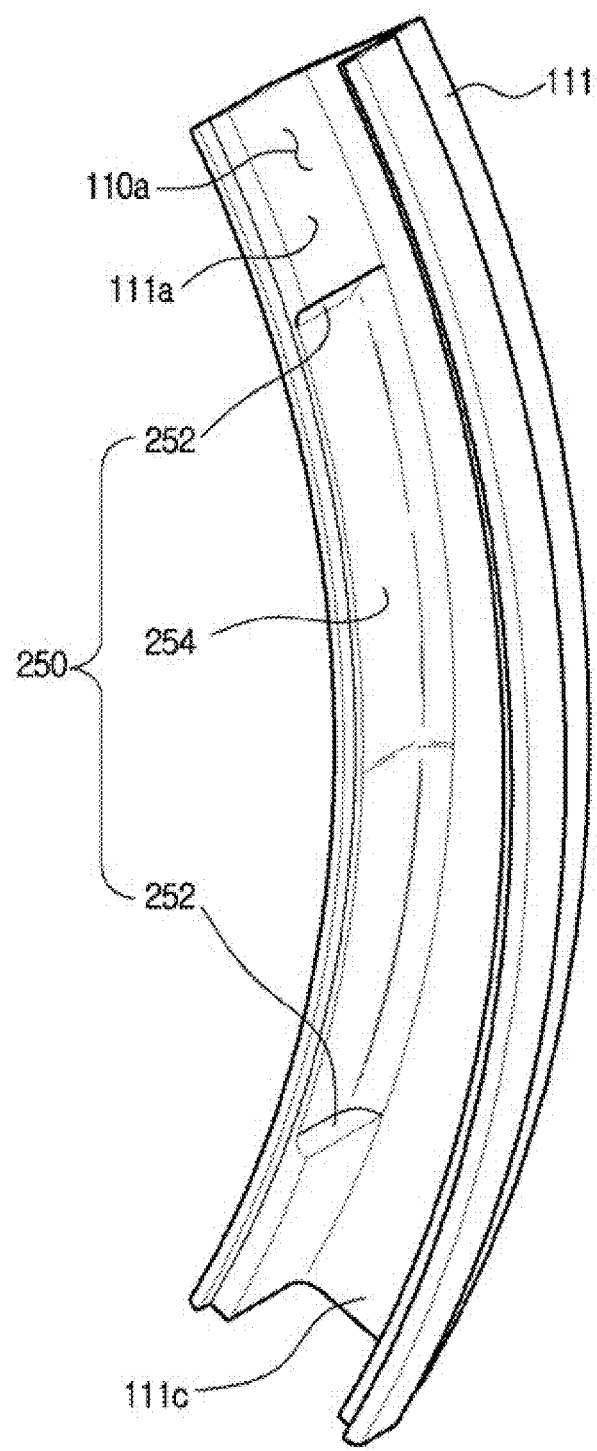
FIGS. 20A and 20B are views illustrating a groove according to a first modified embodiment of the present disclosure.
Figure 20B:
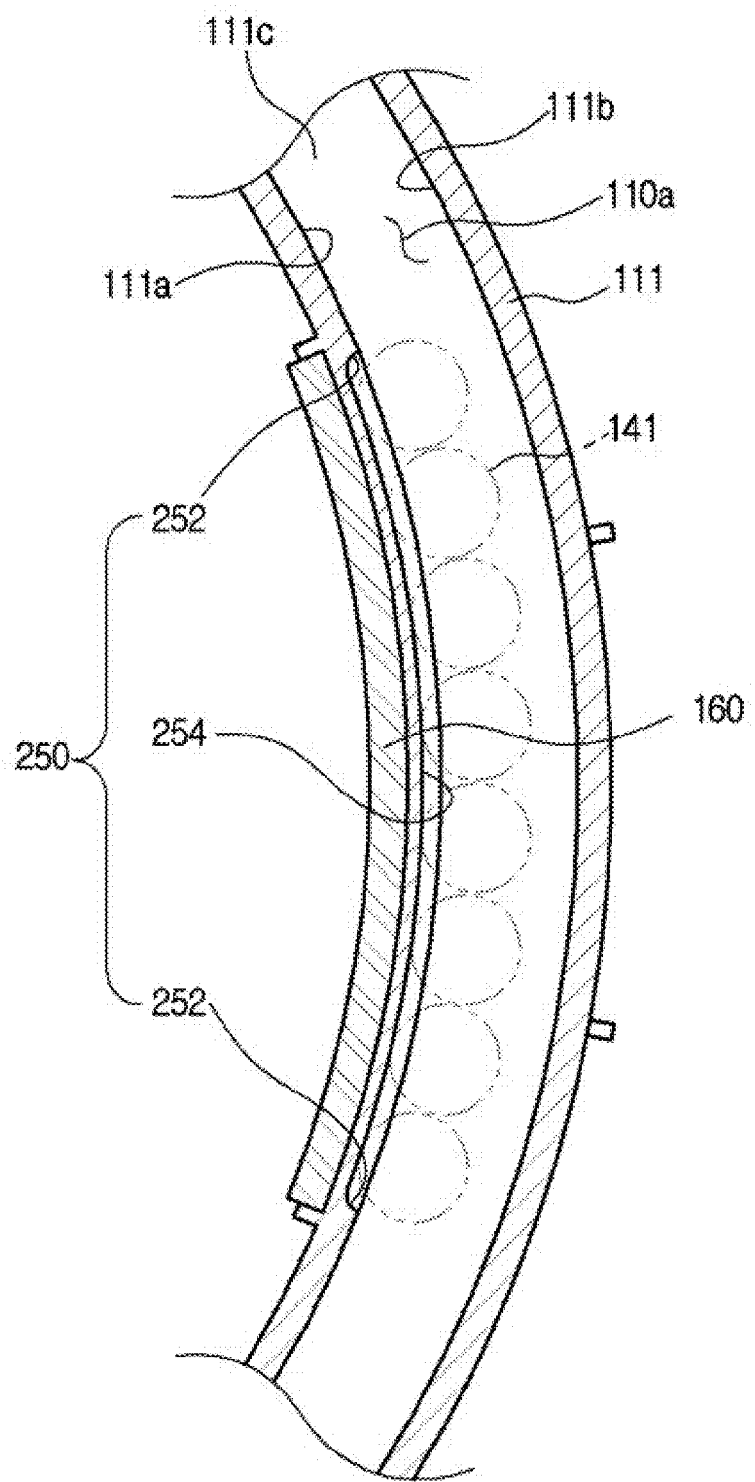

FIGS. 20A and 20B are views illustrating a groove according to a first modified embodiment of the present disclosure.

As shown in FIGS. 20A and 20B, a groove 250 may be formed on the first inner surface 111a of the first housing 111.

The groove 250 is elongated in the circumferential direction of the balancer housing 110 so as to accommodate at least two masses 141. The groove 250 includes first support portions 252 to support the masses 141 in the substantially circumferential direction of the balancer housing 110, and a second support portion 254 provided between the first support portions 252 to support the masses 141 in the substantially radial direction of the balancer housing 110. The first support portions 252 are provided in a stepped shape at both ends of the groove 250 in order to prevent decoupling of the masses 141 from the groove 250 when the RPM of the drum 30 is within a specific RPM range.

The magnet 160 may be coupled to the inner peripheral surface 111d of the first housing 111 corresponding to the first inner surface 111a of the first housing 111 formed with the groove 250.

Figure 21A:
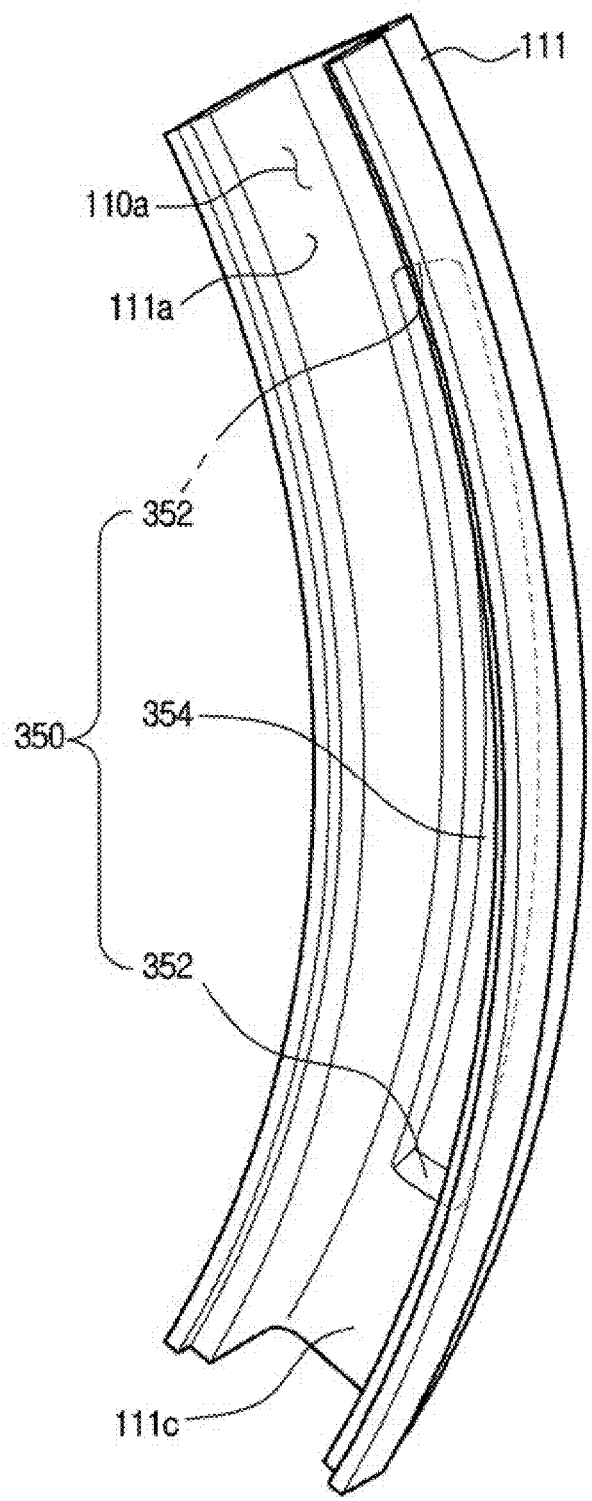
FIGS. 21A and 21B are views illustrating a groove according to a second modified embodiment of the present disclosure.
Figure 21B:
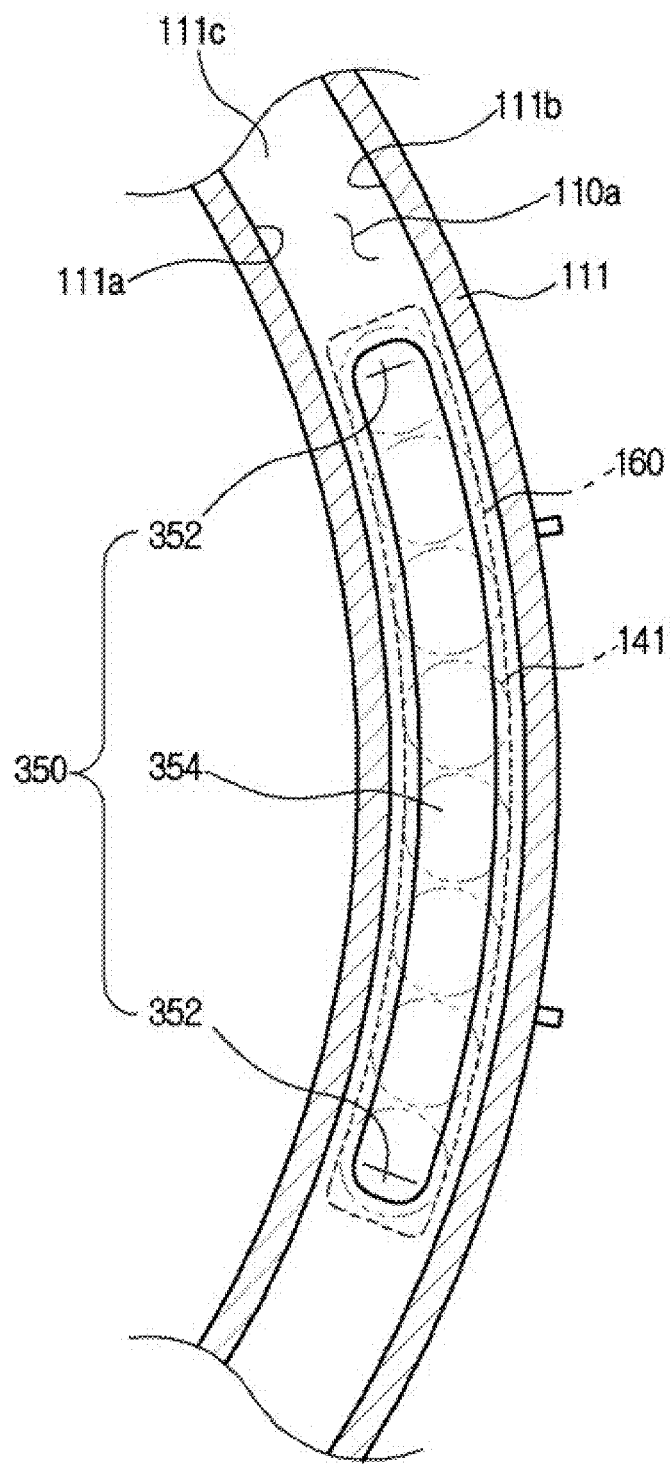

FIGS. 21A and 21B are views illustrating a groove according to a second modified embodiment of the present disclosure.

As shown in FIGS. 21A and 21B, a groove 350 may be formed on the third inner surface 111c of the first housing 111.

The groove 350 according to the second modified embodiment has the same shape and function as those of the groove 250 according to the first modified embodiment, but is different in an arrangement position thereof from the groove 250 according to the first modified embodiment. The groove 350 is elongated in the circumferential direction of the balancer housing 110 so as to accommodate at least two masses 141. The groove 350 includes first support portions 352 to support the masses 141 in the substantially circumferential direction of the balancer housing 110, and a second support portion 354 provided between the first support portions 352 to support the masses 141 in the substantially radial direction of the balancer housing 110. The first support portions 352 are provided in a stepped shape at both ends of the groove 350 in order to prevent decoupling of the masses 141 from the groove 350 when the RPM of the drum 30 is within a specific RPM range.

Figure 22A:
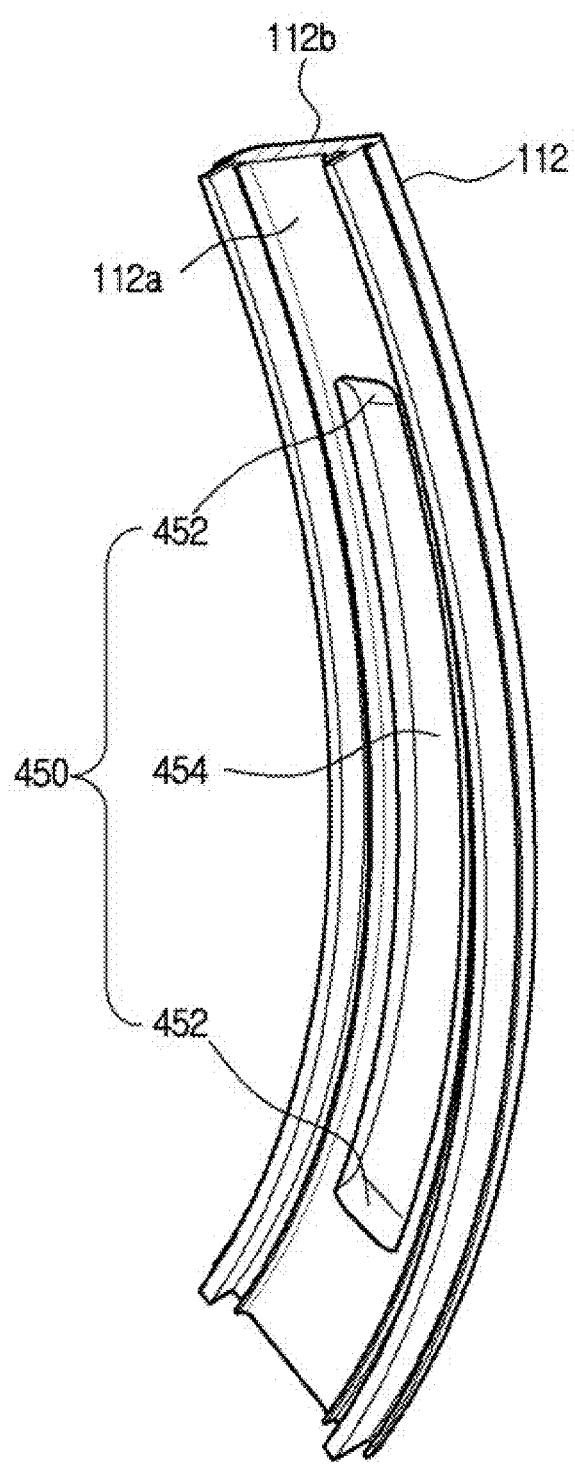
FIGS. 22A and 22B are views illustrating a groove according to a third modified embodiment of the present disclosure.
Figure 22B:
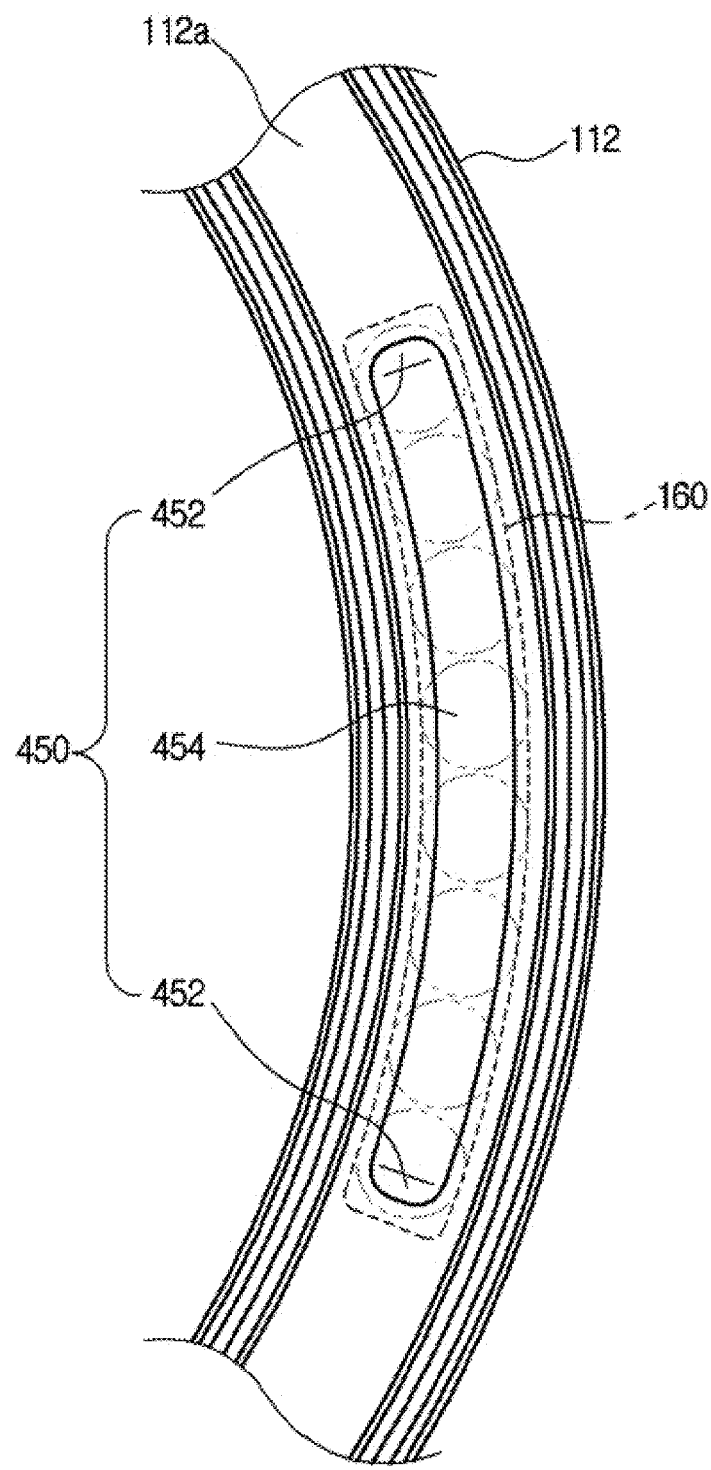

FIGS. 22A and 22B are views illustrating a groove according to a third modified embodiment of the present disclosure.

As shown in FIGS. 22A and 22B, a groove 450 may be formed on an inner surface 112a of the second housing 112 covering the first housing 111.

The groove 450 according to the third modified embodiment has the same shape and function as those of the groove 250 according to the first modified embodiment, but is different in an arrangement position thereof from the groove 250 according to the first modified embodiment. The groove 450 is elongated in the circumferential direction of the balancer housing 110 so as to accommodate at least two masses 141. The groove 450 includes first support portions 452 to support the masses 141 in the substantially circumferential direction of the balancer housing 110, and a second support portion 454 provided between the first support portions 452 to support the masses 141 in the substantially radial direction of the balancer housing 110. The first support portions 452 are provided in a stepped shape at both ends of the groove 450 in order to prevent decoupling of the masses 141 from the groove 450 when the RPM of the drum 30 is within a specific RPM range.

The magnet 160 may be coupled to an outer surface 112b of the second housing 112 corresponding to the inner surface 112a of the second housing 112 formed with the groove 450.

Figure 23:
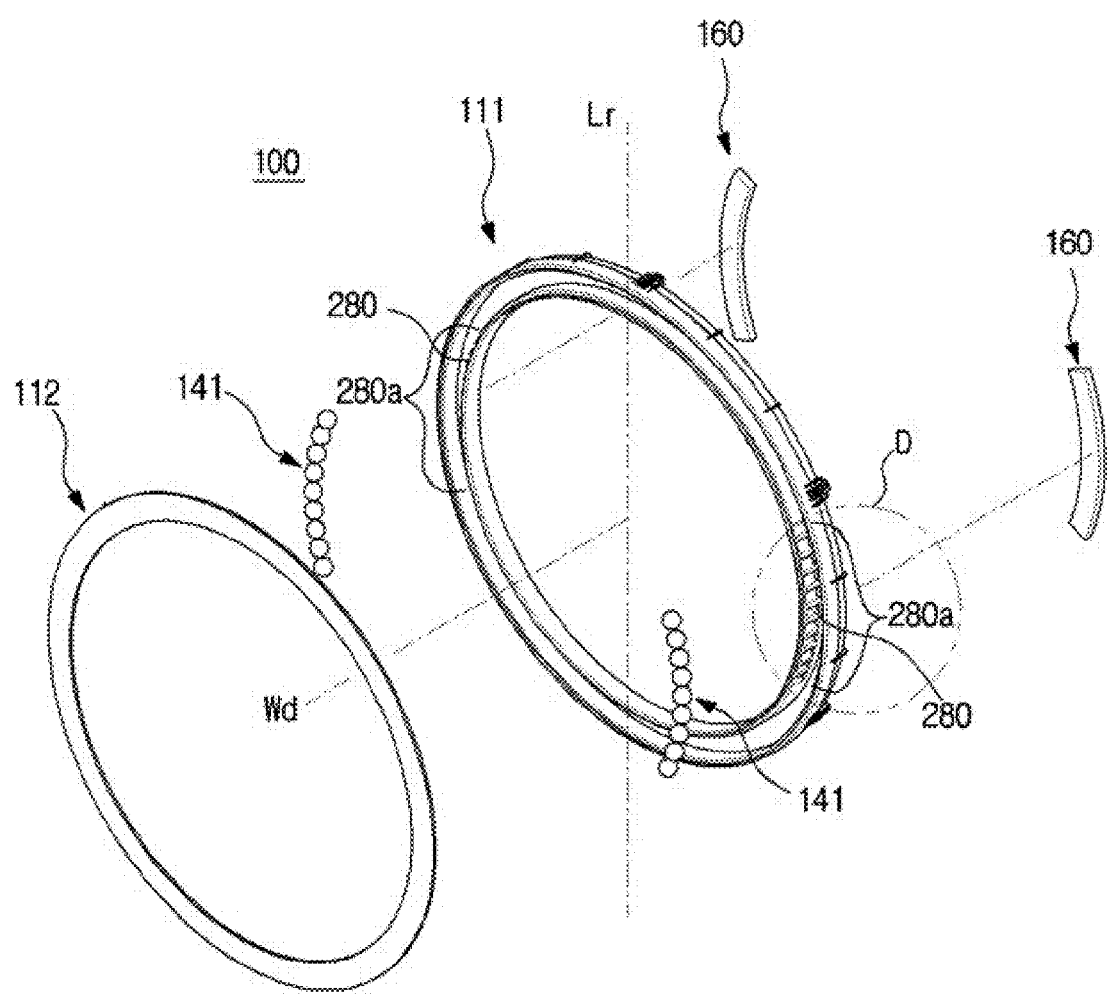
FIG. 23 is an exploded perspective view of a balancer according to another embodiment of the present disclosure.
Figure 24:
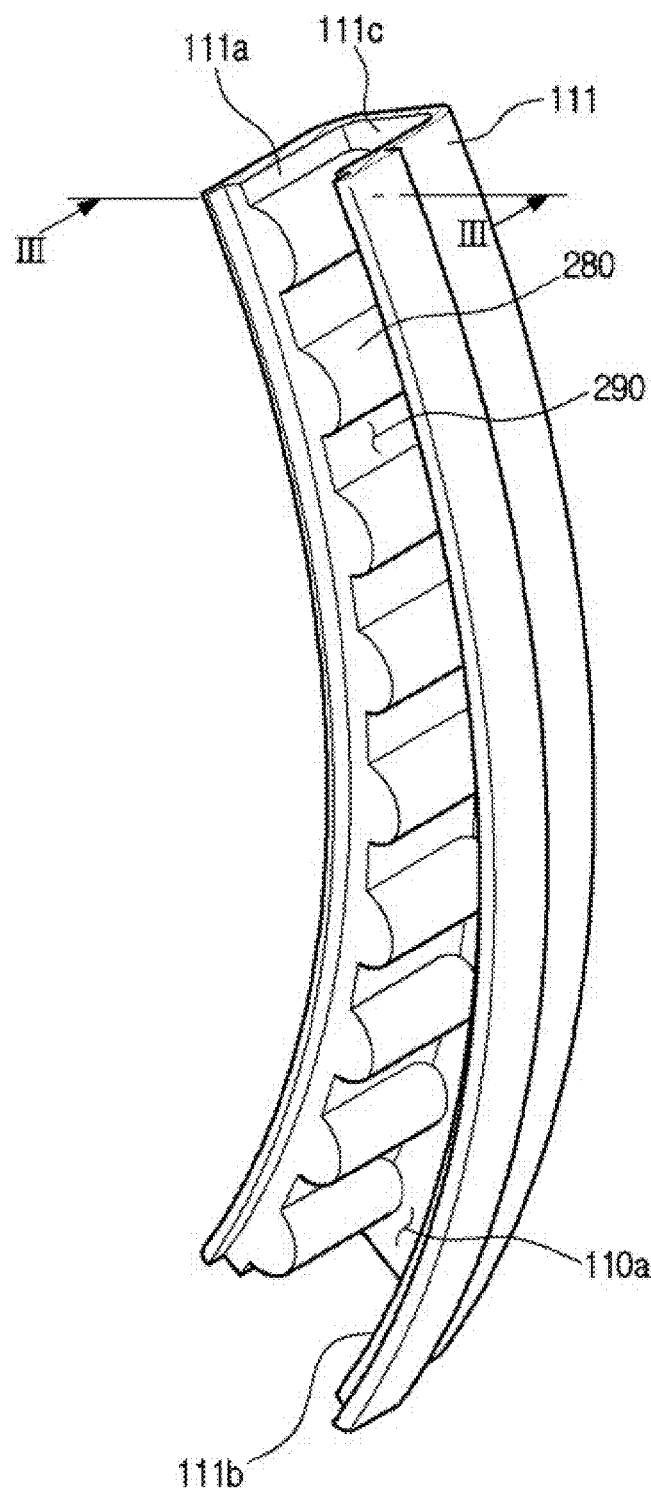
FIG. 24 is an enlarged view of portion "D" in FIG. 23.
Figure 25:
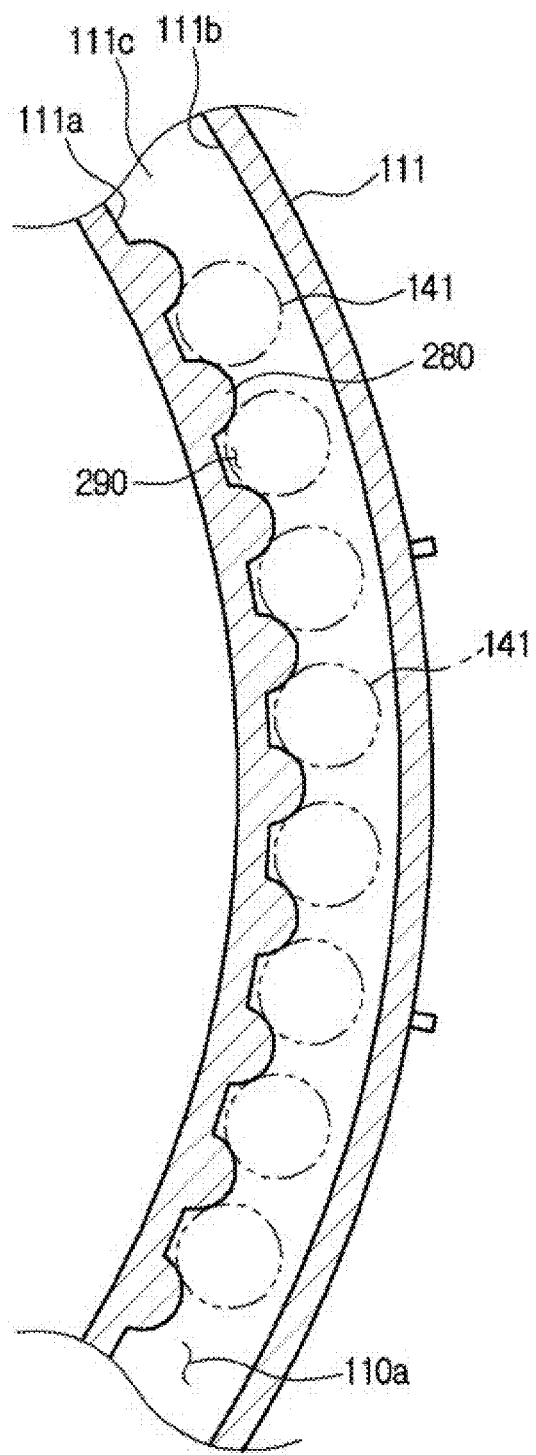
FIG. 25 is a cross-sectional view taken along line III-III in FIG. 24.

FIG. 23 is an exploded perspective view of a balancer according to another embodiment of the present disclosure. FIG. 24 is an enlarged view of portion "D" in FIG. 23. FIG. 25 is a cross-sectional view taken along line III-III in FIG. 24. For convenience of description, redundant description with the balancer according the above-mentioned embodiment will be omitted.

As shown in FIGS. 23 to 25, a balancer 200 includes a plurality of protrusions 280 configured to restrict movement of the masses 141 when the RPM of the drum 30 is within a specific RPM range.

The plural protrusions 280 protrude from the inner surface of the balancer housing 110. Although FIGS. 23 to 25 show that the plural protrusions 280 protrude from the first inner surface 111a of the first housing 111, positions from which the plural protrusions 280 protrude are not limited thereto. For example, the plural protrusions 280 may also protrude from the third inner surface 111c of the first housing 111 or from the inner surface of the second housing 112 covering the first housing 111.

The plural protrusions 280 are spaced apart from each other in the circumferential direction of the balancer housing 110. A plurality of receiving grooves 290 to receive the masses 141 is provided between the respective plural protrusions 280. The plural protrusions 280 and the plural receiving grooves 290 are alternately arranged.

The plural protrusions 280 spaced in the circumferential direction of the balancer housing 110 form one protrusion group 280a. At least two protrusion groups 280a may be arranged in the circumferential direction of the balancer housing 110, and be symmetrically arranged on the basis of the imaginary line Lr which passes through the center of rotation of the drum 30 and is perpendicular to the ground.

Before the drum 30 rotates, the masses 141 are wholly arranged at the bottom of the balancer housing 110 by gravity. In such a state, when the dehydration begins and the drum 30 rotates, the centrifugal force acts on the masses 141 so that the masses 141 move along the channel 110a of the balancer housing 110 to be accommodated and seated in the plural receiving grooves 290 in the course of moving along the channel 110a of the balancer housing 110, as shown in FIG. 25. The movement of the masses 141 accommodated and seated in the plural receiving grooves 290 is restricted until the RPM of the drum 30 does not depart from a specific RPM range. When the RPM of the drum 30 departs from a specific RPM range, the masses 141 are decoupled from the plural receiving grooves 290 and perform a balancing function of the drum 30 while moving along the channel 110a.

Figure 26:
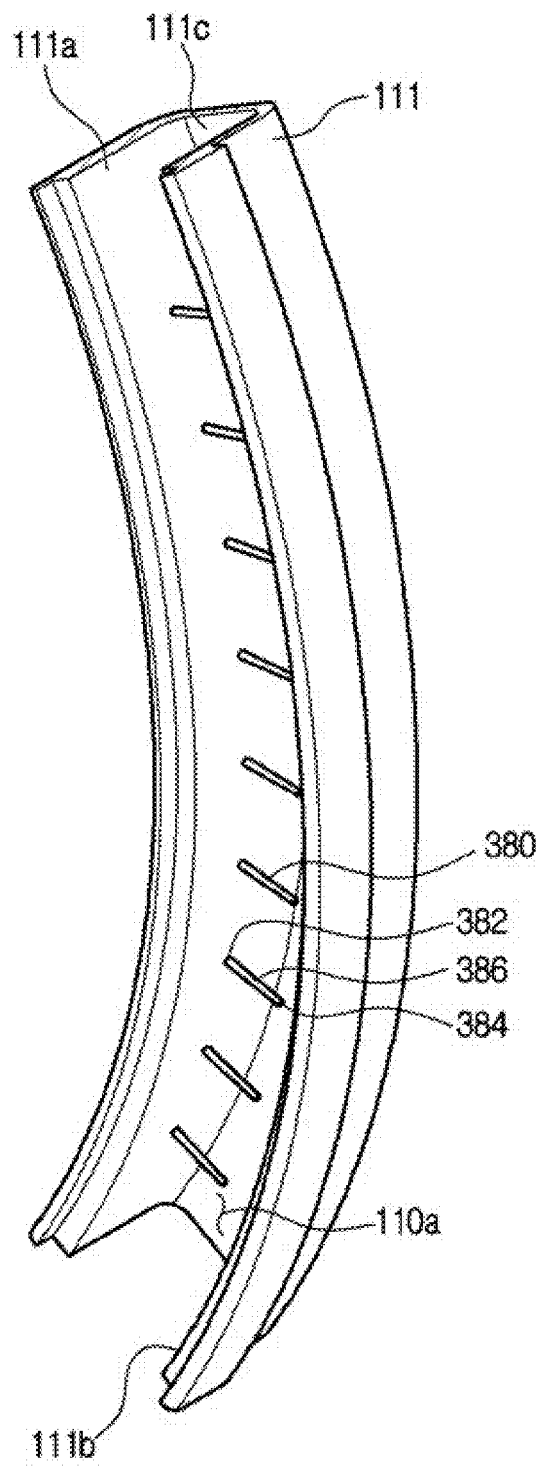
FIG. 26 is a view illustrating protrusions according to a modified embodiment of the present disclosure.
Figure 27B:
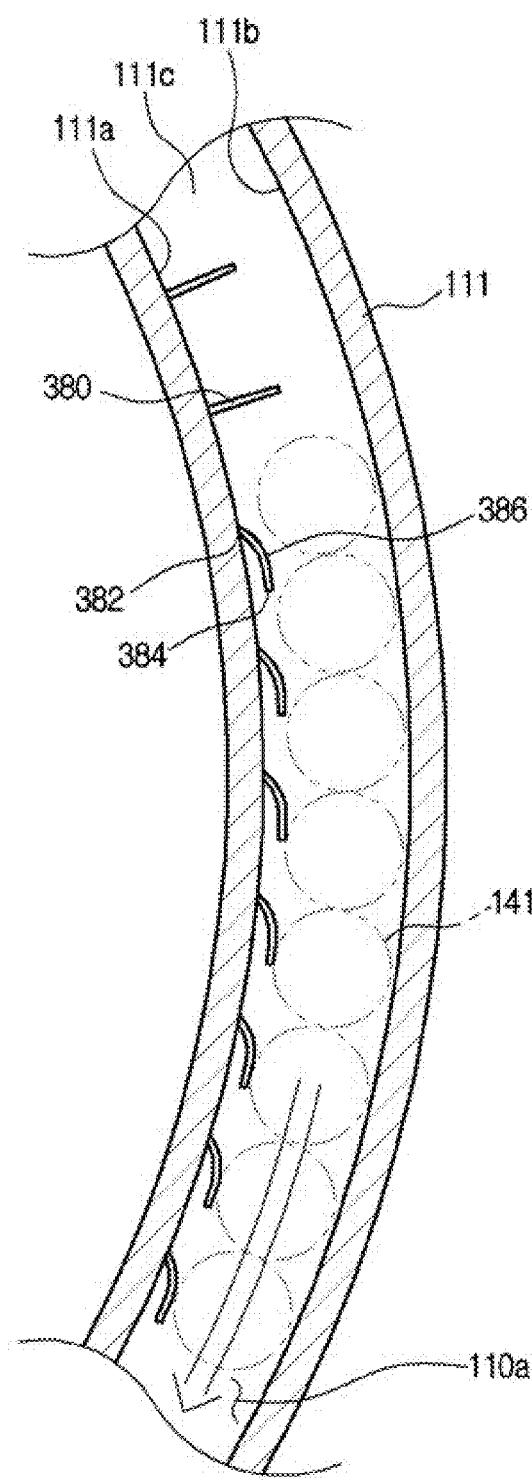

FIG. 26 is a view illustrating protrusions according to a modified embodiment of the present disclosure. FIGS. 27A and 27B are views for explanation of a process in which masses are restricted by and decoupled between a plurality of protrusions.

As shown in FIGS. 26, 27A, and 27B, a plurality of protrusions 380 may be formed in a cantilever shape. Each of the plural protrusions 380 includes a fixed end 382 fixed to the inner surface of the balancer housing 110, a free end 384 configured to be freely bent at the inside of the balancer housing 110, and an extension portion 386 extending from the fixed end 382 to the free end 384.

The protrusions 380 may be made of an elastic material such that movement of the masses 141 may be restricted by the protrusions 380 when the RPM of the drum 30 is within a specific RPM range and such that the masses 141 may be decoupled between the protrusions 380 when the RPM of the drum 30 departs from a specific RPM range. As shown in FIG. 27A, when the RPM of the drum 30 is within a specific RPM range, the masses 141 are arranged between the respective plural protrusions 380 and are restricted by the plural protrusions 380. As shown in FIG. 27B, when the RPM of the drum 30 departs from a specific RPM range, the masses 141 are decoupled between the plural protrusions 380 against elastic force, and the protrusions 380 are bent in decoupling directions of the masses 141 and are then returned back to an original shape by the elastic force during decoupling of the masses 141.

The plural protrusions 380 protrude from the inner surface of the balancer housing 110. Although FIGS. 26 to 27B show that the plural protrusions 380 protrude from the first inner surface 111a of the first housing 111, positions from which the plural protrusions 380 protrude are not limited thereto. For example, the plural protrusions 380 may also protrude from the third inner surface 111c of the first housing 111 or from the inner surface of the second housing 112 covering the first housing 111. The extension portion 386 extends in the radial direction of the balancer housing 110 in a structure in which the plural protrusions 380 protrude from the first inner surface 111a of the first housing 111, whereas the extension portion 386 extends in a direction parallel with the rotation axis Wd of the drum 30 in a structure in which the plural protrusions 380 protrude from the third inner surface 111c of the first housing 111 or the inner surface of the second housing 112.

Before the drum 30 rotates, the masses 141 are wholly arranged at the bottom of the balancer housing 110 by gravity. In such a state, when the dehydration begins and the drum 30 rotates, the centrifugal force acts on the masses 141 so that the masses 141 move along the channel 110a of the balancer housing 110 to be accommodated between the plural protrusions 380 in the course of moving along the channel 110a of the balancer housing 110, as shown in FIG. 27A. The movement of the masses 141 accommodated between the plural protrusions 380 is restricted until the RPM of the drum 30 does not depart from a specific RPM range. As shown in FIG. 27B, when the RPM of the drum 30 departs from a specific RPM range, the masses 141 are decoupled between the plural protrusions 380 and perform a balancing function of the drum 30 while moving along the channel 110*a*.

As is apparent from the above description, a balancer according to embodiments of the present disclosure may stabilize rotational motion of a drum by efficiently offsetting an unbalanced load acting on the drum.

In addition, it may be possible to prevent generation of vibration and noise due to a mass for balancing before the drum reaches a specific rotation speed.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A balancer mounted to a drum of a washing machine to offset an unbalanced load caused within the drum during rotation of the drum, the balancer comprising:
    a balancer housing having an annular channel therein;
    at least one mass movably disposed in the annular channel;
    at least one groove recessed in an inner surface of the balancer housing so as to accommodate the mass; and
    at least one magnet coupled to an outer surface of the balancer housing, an intensity of the magnet being configured to restrict the at least one mass accommodated in the at least one groove when an RPM of the drum is below a predetermined RPM, whereby the at least one mass is decoupled from the at least one groove when the RPM of the drum is at or above the predetermined RPM,
    wherein the at least one magnet is configured as a plurality of N poles and S poles which are arranged alternately in a circumferential direction, and the outermost pole of the magnet among the plural N poles and S poles has a relatively shorter circumferential length than another adjacent pole.

2. The balancer according to claim 1, wherein a ratio between the circumferential length of the outermost poles of the at least one magnet and the length of another pole adjacent to the outermost pole of the at least one magnet is between 1:3 to 2:3.

3. The balancer according to claim 1, wherein a ratio between the circumferential length of the outermost poles of the at least one magnet and a diameter of the at least one mass is between 1:0.6 to 1:1.4.

4. The balancer according to claim 1, wherein when the drum is rotated, a direction of centrifugal force acting on the mass is perpendicular to a direction of magnetic force of the at least one magnet acting on the at least one mass.

5. The balancer according to claim 1, wherein the at least one magnet is coupled to a rear surface of the balancer housing.

6. The balancer according to claim 1, wherein the balancer housing comprises:
    a first housing opened at one side thereof; and
    a second housing covering the first housing to form the annular channel, and
    wherein the at least one magnet is coupled to a rear surface of the first housing.

7. The balancer according to claim 1, wherein the at least one magnet has a relatively longer length than the groove.

8. The balancer according to claim 1, wherein the at least one magnet is disposed at a position corresponding to the at least one groove, and the at least one magnet is coupled to the balancer housing such that both ends of the at least one magnet protrude farther than both ends of the at least one groove.

9. The balancer according to claim 1, wherein a length by which one end of the at least one magnet protrudes farther than one end of the at least one groove is from 3 mm to 9 mm.

10. The balancer according to claim 1, wherein the at least one magnet is disposed at a position corresponding to the at least one groove, and a gap between the at least one magnet and the at least one groove is from 1 mm to 3 mm.

11. The balancer according to claim 10, wherein the at least one groove comprises a flat surface protruding inward of at least the channel; and
    a gap between the at least one magnet and the flat surface is from 2 mm to 6 mm.

12. A washing machine comprising:
    a cabinet;
    a drum rotatably arranged within the cabinet;
    an annular recess provided in the drum; and
    a balancer to offset an unbalanced load caused within the drum during rotation of the drum,
    wherein the balancer comprises
    a balancer housing mounted to the recess and having an annular channel therein;
    at least one mass movably disposed in the annular channel;
    at least one groove recessed in an inner surface of the balancer housing so as to accommodate the mass; and
    at least one magnet coupled to an outer surface of the balancer housing, an intensity of the at least one magnet being configured to restrict the at least one mass accommodated in the at least one groove when an RPM of the drum is below a predetermined RPM, whereby the at least one mass is decoupled from the at least one groove when an RPM of the drum is at or above the predetermined RPM,
    wherein the at least one magnet is configured as a plurality of divided magnets arranged in a circumferential direction of the balancer housing, and outermost divided magnets from among the plurality of divided magnets comprise one N pole and one S pole having different circumferential lengths, an outermost pole of the one N pole and one S pole having a shorter circumferential than the other pole.

13. The washing machine according to claim 12, wherein a ratio between the circumferential length of a relatively longer pole and the circumferential length of a relatively shorter pole among the N pole and S pole is between 1.5:1 to 3:1.

14. The washing machine according to claim 12, wherein the plurality of divided magnets comprise a first divided magnet, a second divided magnet, and a third divided magnet which are disposed at both sides of the first divided magnet.

15. The washing machine according to claim 14, wherein the first divided magnet comprises at least one N pole and one S pole having the same length as each other.

16. A washing machine comprising:
    a cabinet;
    a drum rotatably arranged within the cabinet;
    a balancer connected to the drum to offset an unbalanced load caused within the drum during rotation of the drum, wherein the balancer comprises
a balancer housing having an annular channel therein;
at least one mass movably disposed in the annular channel;
at least one groove formed inside the balancer housing to accommodate the mass; and
at least one magnet coupled outside the balancer housing opposite to the mass, an intensity of the at least one magnet being configured to restrict the at least one mass accommodated in the at least one groove when an RPM of the drum is below a predetermined RPM, whereby the at least one mass is decoupled from the at least one groove when the RPM of the drum is at or above the predetermined RPM,
wherein the at least one magnet comprises a plurality of circumferentially arranged N and S poles, outermost poles from among the plurality of N poles and one S poles having shorter circumferential lengths than the remaining N and S poles.

17. The washing machine according to claim 16, wherein a ratio between the circumferential length of the remaining N and S poles and the outermost poles having shorter circumferential lengths is between 1.5:1 to 3:1.

18. A balancer mounted to a drum of a washing machine comprising:
a balancer housing having an annular channel therein;
a mass movably disposed in the annular channel;
a groove recessed in an inner surface of the balancer housing to accommodate the mass; and
at least one magnet configured as a plurality of N poles and S poles alternately arranged in a circumferential direction, with outermost poles of the plurality of N poles and S poles having a shorter circumferential length than an adjacent pole, so that the at least one magnet has an intensity that restricts the mass accommodated in the groove when revolutions per minute (RPM) of the drum is below a predetermined RPM, and so that the mass is decoupled from the groove when the RPM of the drum is at or above the predetermined RPM.

* * * * *

UNITED STATES PATENT AND TRADEMARK OFFICE
CERTIFICATE OF CORRECTION

PATENT NO. : 9,765,466 B2  
APPLICATION NO. : 14/308940  
DATED : September 19, 2017  
INVENTOR(S) : Jeong Hoon Kang et al.

Page 1 of 1

It is certified that error appears in the above-identified patent and that said Letters Patent is hereby corrected as shown below:

In the Claims

Column 19, Line 37:
In Claim 1, delete "the magnet" and insert -- the at least one magnet --, therefore.

Column 19, Line 37:
In Claim 1, delete "has" and insert -- have --, therefore.

Column 19, Line 43:
In Claim 2, delete "pole" and insert -- poles --, therefore.

Column 19, Line 50:
In Claim 4, delete "the" and insert -- the at least one --, therefore.

Column 20, Line 36:
In Claim 12, delete "an" and insert -- the --, therefore.

Column 12, Line 44:
In Claim 12, delete "circumferential" and insert -- circumferential length --, therefore.

Column 21, Line 17:
In Claim 16, delete "one S" and insert -- S --, therefore.

Signed and Sealed this
Fourteenth Day of November, 2017

Joseph Matal
*Performing the Functions and Duties of the
Under Secretary of Commerce for Intellectual Property and
Director of the United States Patent and Trademark Office*